United States Patent [19]
Udd

[11] Patent Number: 5,455,698
[45] Date of Patent: Oct. 3, 1995

[54] SECURE COMMUNICATION ALARM SYSTEM

[75] Inventor: Eric Udd, Huntington Beach, Calif.

[73] Assignee: McDonnell Douglas Corporation, Huntington Beach, Calif.

[21] Appl. No.: 466,707

[22] Filed: Dec. 27, 1989

[51] Int. Cl.$^6$ .................................................. H04B 10/02
[52] U.S. Cl. ......................... 359/119; 359/118; 359/126; 359/164; 359/173; 359/183; 359/188; 359/195
[58] Field of Search ............................ 359/110–115, 119, 359/123, 124, 118, 126, 164, 173, 183, 188, 195; 340/555, 600, 825.05; 380/49, 59

[56] References Cited

U.S. PATENT DOCUMENTS

| | | | |
|---|---|---|---|
| 4,207,561 | 6/1980 | Steensma | 340/600 |
| 4,217,488 | 8/1980 | Hubbard | 359/112 |
| 4,435,850 | 3/1984 | Bowen et al. | 359/112 |
| 4,501,021 | 2/1985 | Weiss | 359/110 |
| 4,837,856 | 6/1989 | Glista, Jr. | 359/110 |
| 4,903,339 | 2/1990 | Solomon | 359/112 |
| 4,965,856 | 10/1990 | Swanic | 359/112 |

FOREIGN PATENT DOCUMENTS

| | | | |
|---|---|---|---|
| 0136271 | 4/1985 | European Pat. Off. | 359/112 |
| 0227362 | 7/1987 | European Pat. Off. | 359/119 |
| 0365371 | 4/1990 | European Pat. Off. | 359/112 |

*Primary Examiner*—Bernarr E. Gregory
*Attorney, Agent, or Firm*—Donald E. Stout; John P. Scholl; Roger C. Turner

[57] ABSTRACT

A secure fiber optic communication that is based on physical properties of light propagating through a Sagnac interferometer in combination with optical power alarms. These alarms are then used to alert users to intrusion and to shut down communications to avoid compromising data.

18 Claims, 30 Drawing Sheets

SECURE COMMUNICATION ALARM SYSTEM

BACKGROUND OF THE INVENTION

This invention relates generally to fiber optic communication systems and, more particularly, to Sagnac interferometer based fiber optic systems that utilize counterpropagating light paths to form a fiber optic communications loop. Alarm systems, which are adapted to detect changes in the optical characteristics in the loop, including changes in the optical power or optical frequency, are used to avoid the risk of compromising data and to alert users to an intrusion attempt.

The need for high bandwidth secure communication systems that are amenable to use in networks and which minimize the need for encryption is becoming increasingly acute. Long-term trends for very high bandwidth sensors, computers, and multichannel video display capabilities will dictate the specific designs utilized in serving this type of technology. The advent of fiber optics has opened up a new era where very high speed, low cost telecommunication is possible.

SUMMARY OF THE INVENTION

There is provided by this invention a Sagnac interferometer based secure communication system using a short coherence length light source in combination with counterpropagating paths that have inherent self-matching characteristics to make an intrusion resistant telecommunications link.

In one of the simplest forms of the Sagnac interferometer based secure communication system, light from a broadband light source such as a light emitting diode is directed into a first port of a beamsplitter. A second port of the beamsplitter is directed toward a detector which monitors amplitude fluctuations of the light source. Usually the light beam is directed through polarizing and spatial filter elements before introduction into the beamsplitter to ensure that counterpropagating beams through the interferometer loop transverse the same path. The third and fourth ports of the beamsplitter enable a split light beam to counterpropagate about a common path. Data is impressed upon the counterpropagating light beams by modulating their relative phase.

When the two beams of light recombine on the beamsplitter, their difference in phase causes the light beam that returns via the polarizing and spatial filter elements to be amplitude modulated. When the combined beams return to the beamsplitter, a portion of this amplitude modulated light beam is directed into a detector which converts the light signal into an amplitude modulated electrical signal corresponding to the data impressed onto the light beam.

The light source, beamsplitters, beam conditioning optics, detector and associated support electronics constitute the receiver for the system. The optical and electrical support elements used to impress the relative phase difference between the counterpropagating light beams is the transmitter for the system.

The security of the system is based on a combination of the information being impressed on the relative phase difference between the counterpropagating light beams and the low coherence length of the light source.

The lowest noise, highest performance Sagnac interferometers employ broadband light sources with very low coherence lengths to reduce both the amplitude noise of the light source, and spurious noise due to coherent backscatter throughout the fiber loop. Since information impressed upon the system depends upon the phase relationship between the counterpropagating light beams, the two beams must be mixed to extract the signal. Since recorders do not exist at the frequencies of $10^{14}$ HZ typical of light beams, this must be done in real time. An intruder trying to tap the system would first have to access both counterpropagating beams if the system were to be passively tapped.

In addition, the intruder would have to access both counterpropagating beams and match the pathlength of the two beams to within a few coherence lengths characteristic of the light source in order that the amplitude modulated output signal may be constructed. Since the counterpropagating pathlengths may differ by kilometers at the point of interception, and since the coherence length of a low coherence light source such as light emitting or superradiant diode may be on the order of 30 microns, tapping into the system becomes an extremely difficult and time consuming task analogous to finding a needle in a haystack.

To make this system even more extremely secure a random pathlength generator may be used to randomly vary the relative pathlength of the two counterpropagating beams. This is equivalent to having the needle in the haystack moved randomly throughout the haystack. In the unlikely event the intruder manages to achieve the pathlength matching condition, a new equally difficult pathlength condition chosen totally at random occurs a short time later. The situation is analogous to luckily stumbling on the needle in the haystack only to have it hidden once again at some random location in the haystack an instant later.

An alternative approach is to utilize optical power alarm systems that preclude the potential intruder from obtaining information even if pathlength matching conditions should occur. This approach is analgous to making the needle in the haystack dim and disappear.

This invention will provide a secure single mode optical fiber communication link having very high bandwidths, such that long repeaterless links are possible. This invention will enable utilization of low cost single mode fiber telecommunication technology. The invention will also provide a system which is amenable to uses by multiple users and networking arrangements.

The configuration of the system of the present invention will enable the sending of information at high data rates, using frequency shifters, phase modulators, tap-resistant single mode fibers, random optical pathlength generators, and random amplitude modulation of the system light sources, to prevent unauthorized intrusions. Unauthorized intrusions onto the system, through the use of appropriately configured optical alarm systems, will be precluded. The present invention provides flexible secure communication systems which offer adequate security at the lowest possible cost.

BRIEF DESCRIPTION OF THE PREFERRED EMBODIMENT

The Sagnac interferometer based secure communication system is based upon the usage of a short coherence length light source in combination with the self matching characteristics of the Sagnac interferometer to make an intrusion resistant telecommunication link. Since the system is based upon the use of single-mode fiber optic cable it is compatible with many installed telecommunication links.

Figure 1:
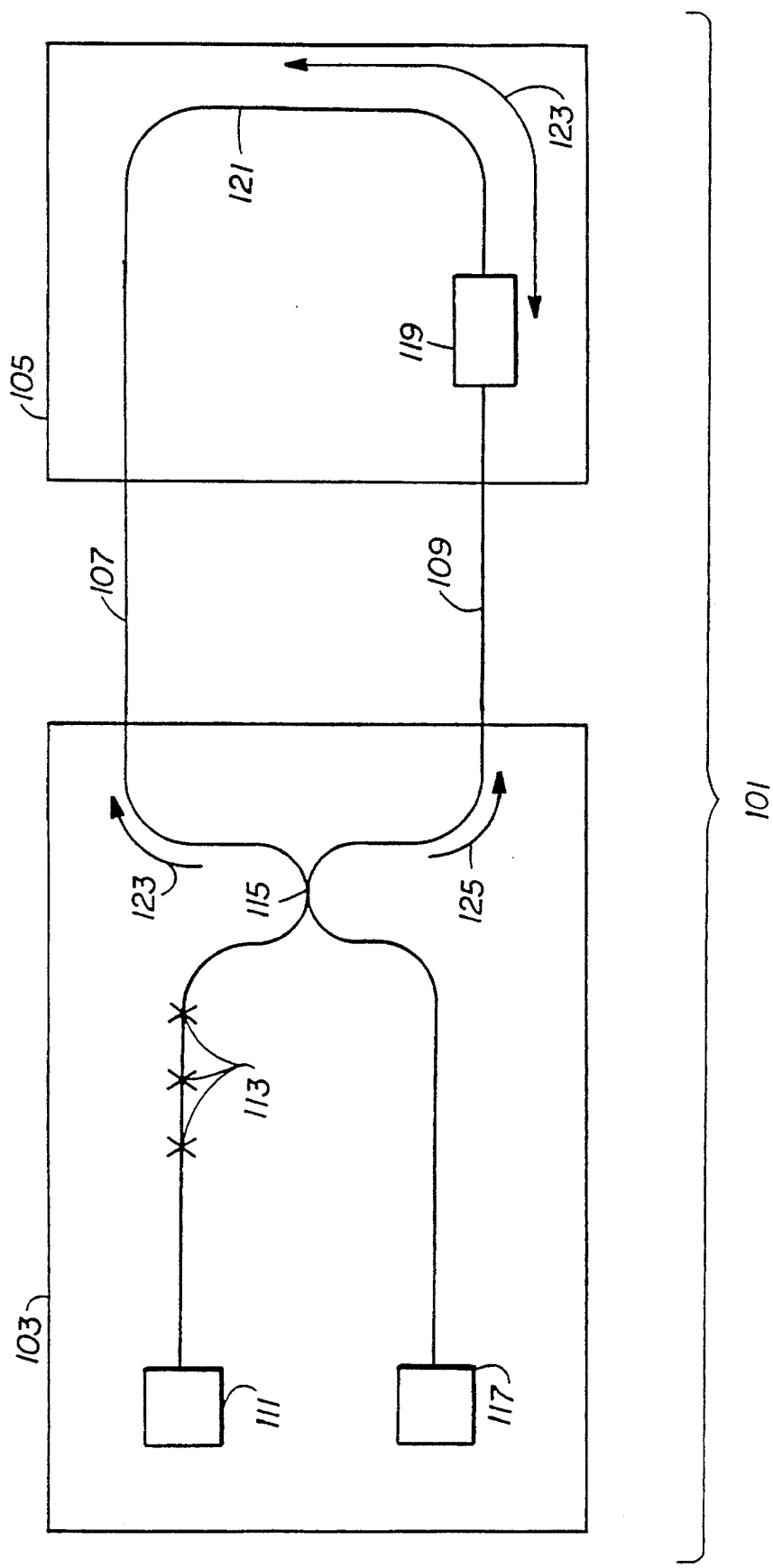
FIG. 1 is a schematical representation of a fiber optic communication system based on the Sagnac interferometer that incorporates the principles of this invention.

Referring to FIG. 1, there is as shown a basic Sagnac interferometer based secure communication link 101. The system consists of a receiver module 103 and a transmitter module 105 interconnected by the fiber optic lines 107 and 109. The receiver module consists of a light source 111, a depolarizing element 113 to enable the usage of conventional low cost single mode optical fiber, a central fiber optic beamsplitter 115 and an output detector 117. Polarization preserving fiber could be used but this would greatly increase cost. The transmitter module 105 consists of a phase modulator 119 that is offset from the center 121 of the loop by the fiber length 123.

The operation of the secure fiber optic communication link of FIG. 1 is as follows. Light from the light source 111 is coupled into an optical fiber and directed through the depolarizing element 113, which may be a fiber Lyot depolarizer, to insure that light entering the central beamsplitter 115 is depolarized. The central beamsplitter 115 splits the light beam into two counterpropagating beams of light which propagate in directions 123 and 125.

The light beam propagating in direction 123 then circulates through the fiber 107 and the center 121, with respect to central beamsplitter 115, and on to the phase modulator 119 which is used to impress data in the form of phase information. The light beam propagating in direction 123 then passes through the fiber 109 back to the central fiber beam splitter 115. The light beam propagating in direction 125 circulates through the system in the opposite direction.

The action of the phase modulator 119 is again to impress phase information upon the light beam propagating in direction 125. When the two light beams 123 and 125 recombine on the central fiber optic beamsplitter 115 they will interfere with one another. This interference results in an amplitude modulated light signal being directed to the output detector 117. The net result occurring in the system is the impression, by the phase modulator 119, of an input data stream onto the system by generation of a relative phase difference between the counterpropagating light beams which travel in directions 123 and 125.

When the two beams recombine on the central beamsplitter 115, the data which is carried to the receiver 103 as quickly as the phase difference is converted to an amplitude modulated signal. The modulated signal is detected by the output detector 117.

Figure 2:
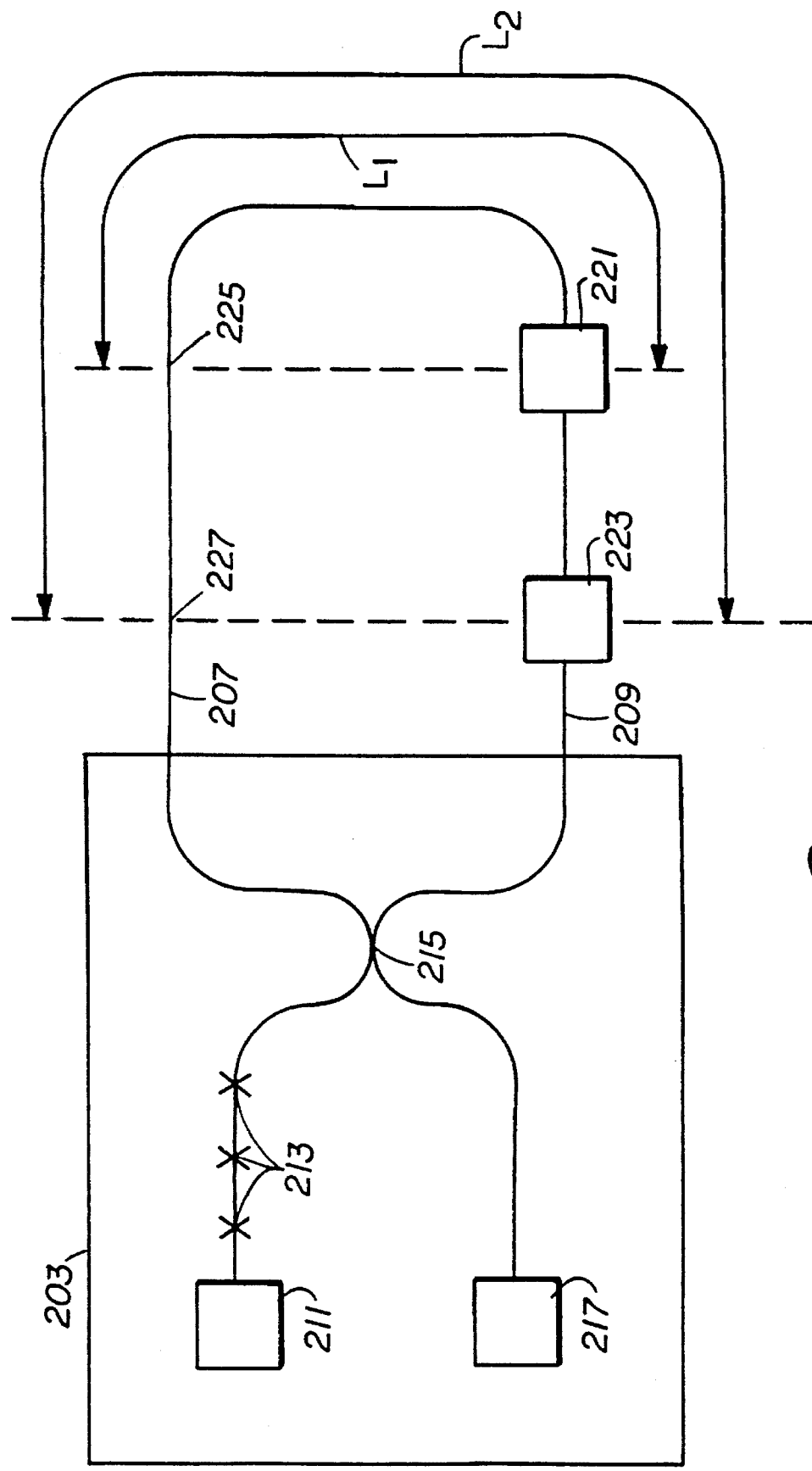
FIG. 2 illustrates a fiber optic communication system for multiple transmitting stations in the communications loop.

FIG. 2 is a diagram of the system configuration which enables the illustration of one method of impressing relative phase differences between the counterpropagating light beams referred to in the discussion for FIG. 1 above. A receiver 203 is illustrated, and is equivalent to receiver 103 of FIG 1. Fiber optic lines 207 and 209 extend from the boundary of receiver 203. The receiver module 203 consists of a light source 211, a depolarizing element 213, a central fiber optic beamsplitter 215 and an output detector 217.

A pair of transmitting stations 221 and 223 are located along a common optic path facilitated by fiber optic lines 207 and 209. A signal may be transmitted from either of the transmitting stations 221 or 223 to the receiver 203. Information may be impressed by the transmitting stations 221 and 223 by using a phase modulator (not shown but similar to phase modulator 119 of FIG. 1) which operates at high data rates over a characteristic period that depends on its position along the lightpath loop formed by fiber optic lines 207 and 209.

In particular, the transmitting station 221 is located a distance $(L-L_1)/2$ in a counterclockwise direction from the beamsplitter 215 where L is the length of the complete round trip light path from beamsplitter 215, along fiberoptic line 207, past transmitting stations 221 and 223, and along fiber optic line 209 back to beamsplitter 209. $L_1$ is the distance between the transmitting station 221 and the symmetrically placed position 225. Symmetrically placed position 225 is also a distance $(L-L_1)/2$ from the beamsplitter 215. $L_2$ is the distance between the transmitting station 223 and the symmetrically placed position 227. Symmetrically placed position 227 is also a distance $(L-L_2)/2$ from the beamsplitter 215.

One means to impress phase information onto the counterpropagating light beams is to operate the phase modulator of the transmitting station 221 over the time interval $[0, L_1 n/c]$ at high data rates, wait during the time interval $[L_1 n/c, 2L_1 n/c]$, transmit during $[2L_1 n/c, 3L_1 n/c]$, wait during $[3L_1 n/c, 4L_1 n/c]$ and so forth. Here n is the index of refraction of the fiber optic lines 207 and 209 and c is the speed of light in a vacuum.

Figure 3:
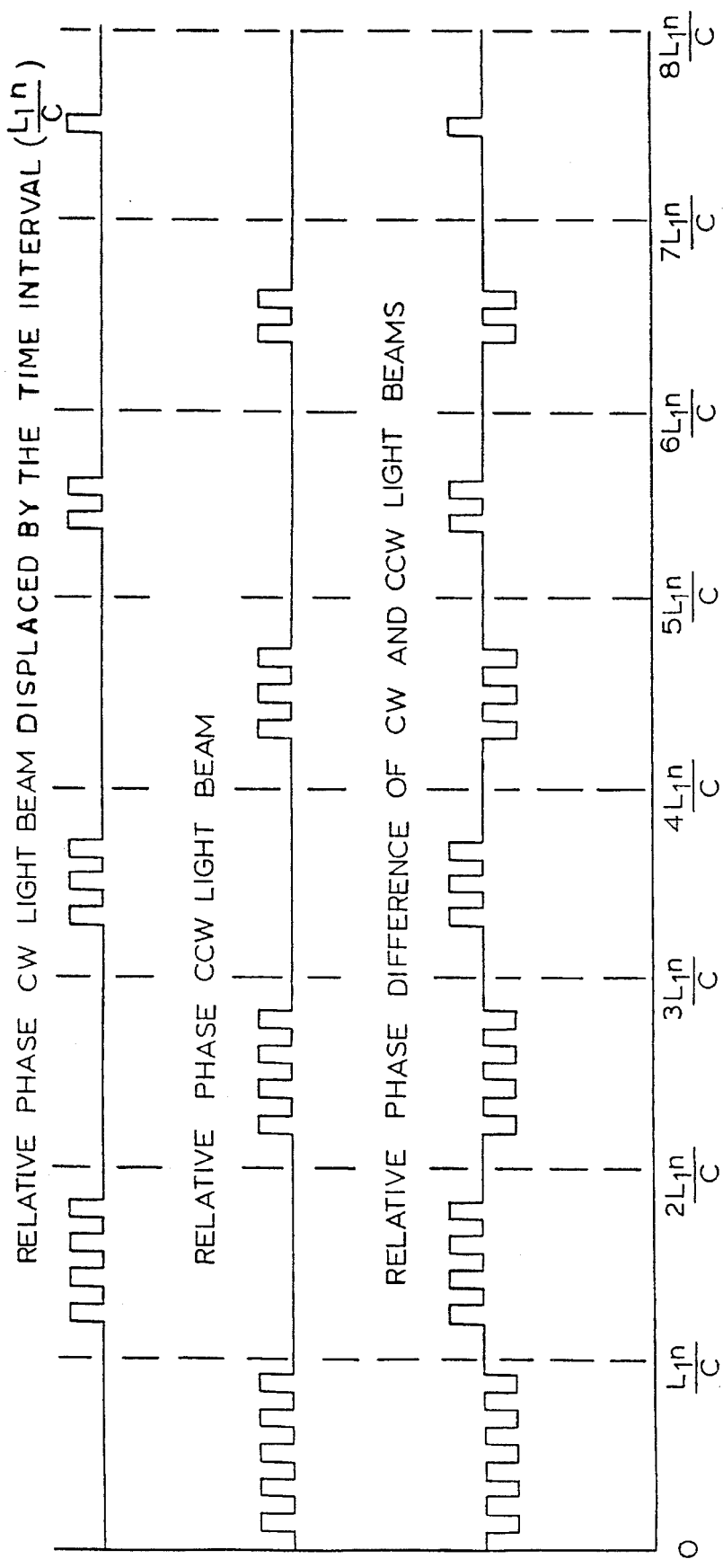
FIG. 3 illustrates a timing diagram for the phase information impressed on the counterpropagating beams in the communications loop of FIG. 2.

A timing diagram illustrating the phase information impressed upon the clockwise and counterclockwise beams and the resulting amplitude modulation due to their relative phase difference when the two beams recombine on the detector is shown in FIG. 3. The diagram corresponds to the situation for transmitter 221 of FIG. 2.

The sequence starts at time zero when a stream of five bits of information are impressed over the time interval $[0, L_1 n/c]$ by shifting the phase of the counterclockwise light beam which originates at the location of transmitter 221 of FIG. 2. At the same time, the clockwise light beam originating from the location 225 propagates through the fiber length $L_1$, and arrives at transmitter 221.

Over the next time interval $[L_1 n/c, 2L_1 n/c]$ the phase modulator of transmitter 221 (not shown in FIG. 2) is turned off such that the counterpropagating light beams are not phase modulated. Since the two counterpropagating light beams which enter the system through the beamsplitter 215 arrive at the location 225 and the phase modulator of transmitter 221 simultaneously, this means that the clockwise light beam which will mix with the counterclockwise light beam modulated over the time interval $[0, L_i n/c]$ passes through the transmitter 221 over the time interval $[L_1 n/c, 2L_1 n/c]$.

For ease of comparison, the relative phase modulation of the clockwise beam is moved back in time by an interval $L_1 n/c$ on the timing diagram of FIG. 3 and thus the interval $[0, L_1 n/c]$ corresponds to $[L_1 n/c, 2L_1 n/c]$ for the clockwise beam, and so forth.

When the two beams are recombined at the beamsplitter 215 after propagating through the fiber optic path represented by L, the two beams have a relative phase difference which is the difference between the clockwise and counterclockwise timing diagram lines shown near the bottom of FIG. 3. Notice that the information packet is repeated twice when the two beams are recombined, but that the sign of the relative phase has changed.

The format method just described in association with FIGS. 2 and 3 relies upon bursting the data with about a 50% duty cycle to avoid "collisions" of the data. An alternative method is to format the input to the phase modulator such that a relative phase difference, between the counterpropagating light beams is established in a continuous manner allowing the transmission of data without interruption.

Figure 4:
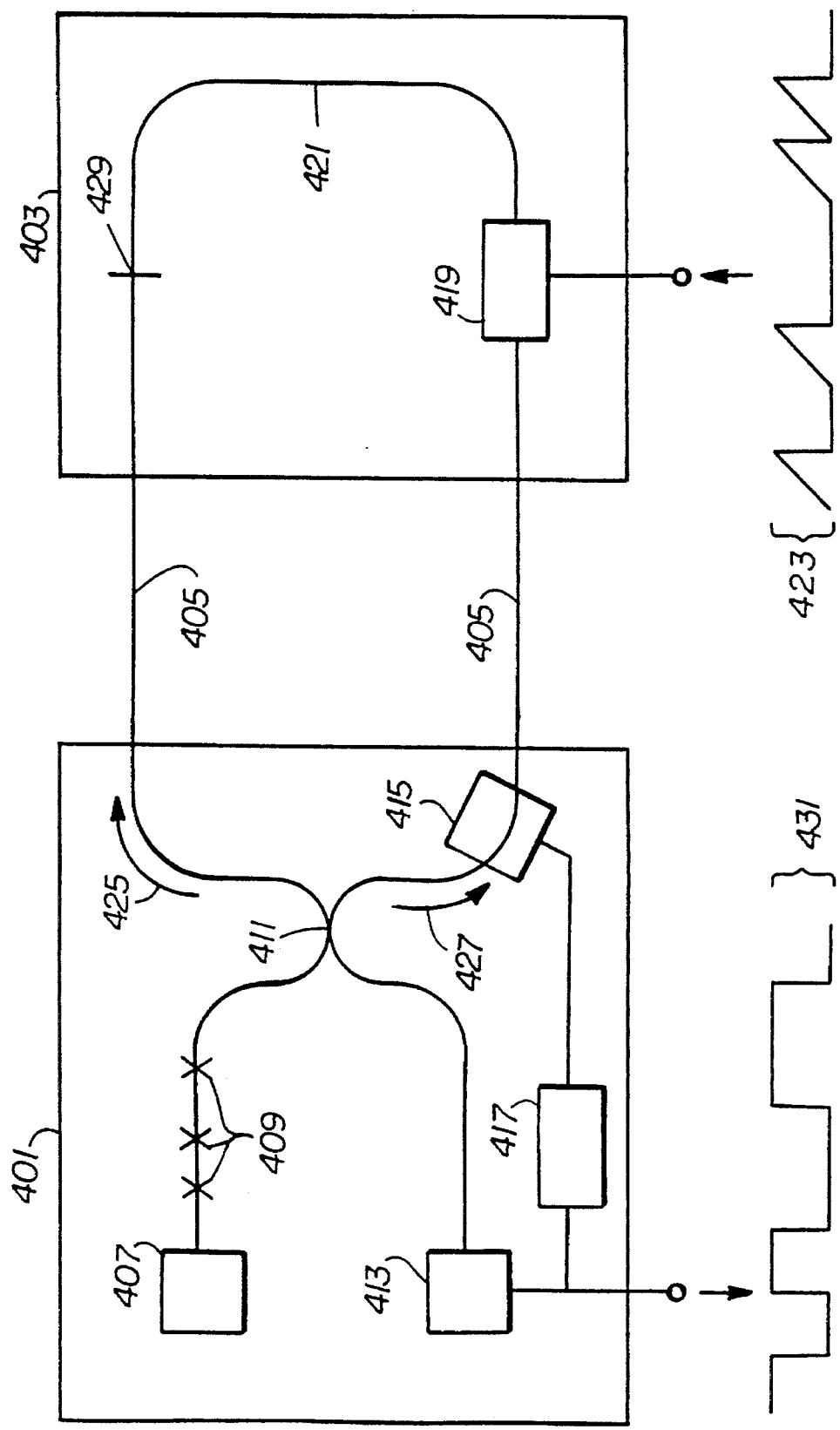
FIG. 4 illustrates the relative phase changes of information impressed on the counterpropagating beams by using a sawtooth or serrodyne waveform as a driver.

FIG. 4 illustrates a basic system employing this technique. The receiver 401 and transmitter 403 are connected by the fiber link 405. Fiber link 405 is equivalent to fiber optic lines 107 and 109 of FIG 1. The receiver consists of a light source 407, depolarizing element 409, central fiber optic beamsplitter 411, output detector 413, phase modulator 415 and bias driver 417. The transmitter 403 consists of the phase modulator 419 and offset fiber 421 arranged to ensure the phase modulator 419 does not lie in the center of the Sagnac loop.

When data in sawtooth form 423 is fed into the phase modulator 419, the ramped part of the sawtooth causes a time varying phase modulation resulting in a relative phase difference between the counterpropagating beams of light travelling in directions 425 and 427 as they circulate through the system. This is due to the offset in time of arrival of the clockwise and counterclockwise beams which is in turn due to the presence of the offset fiber 421.

Because the ramped part of the slope is at a fixed inclination, the phase offset between the two light beams 425 and 427 is fixed. When the phase modulation of the input 423 has zero slope the net difference in phase between the two counterpropagating beams of light is zero. Thus when the two beams 425 and 427 circulate through the system and recombine on the central fiber optic beamsplitter 411 an amplitude modulated light signal will be recreated that is directed toward the output detector 413 to form the output digital signal 431. In general the input to the secure fiber optic communication system at the phase modulator 419 will be differentiated as long as the time interval over which it takes light to traverse the offset fiber 421 between the phase modulator 419 and its reflection point 429 on the Sagnac loop 431 is small compared to the characteristic time interval of the input waveform, which is inversely proportional to the characteristic waveform frequency.

By using this characteritic the system may be used to transmit generalized analog waveforms by first integrating them prior to applying them to the phase modulator 419 and using the system which acts to differentiate them back to their original form. The effectiveness of this approach depends upon appropriate offset of the phase modulator 419 a process that can become increasingly difficult at very high frequencies. The output waveform is shown at 431. The purpose of the phase modulator 415 and bias driver 417 is to offset any nonreciprocal phase drift between the counterpropagating light beams 425 and 427 due to environmental effects or aging of system components. This may be done by applying a sawtooth waveform via the bias driver 417 to the phase modulator 415. The overall purpose of this method is to optimize the output signal of the receiver 401.

Figure 5:
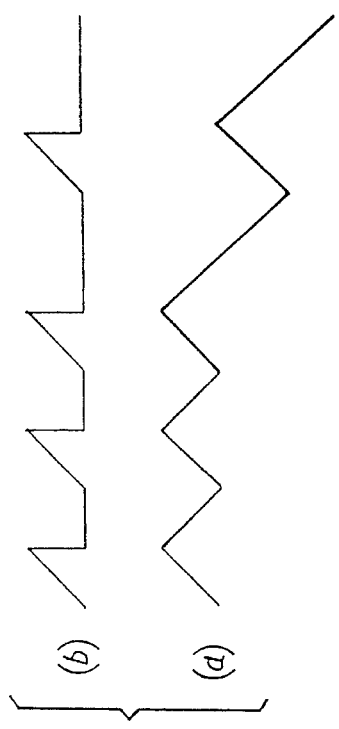
FIG. 5 illustrates the permissible sequence sawtooth waveforms that may be used as drivers for the system of FIG. 4, and the effect of an impermissible sequence.

FIG. 5 illustrates two possible sawtooth approaches. In FIG. 5a the sawtooth has regions of positive (ramped) and negative (nearly vertical) slope corresponding to two net phase differences between the counterpropagating light beams as they travelled in directions 425 and 427 in FIG. 4. The major limitation of this approach is that if the state of the data level does not change, the phase modulator or its driver will run out of dynamic range as is shown in FIG. 5b.

Figure 6:
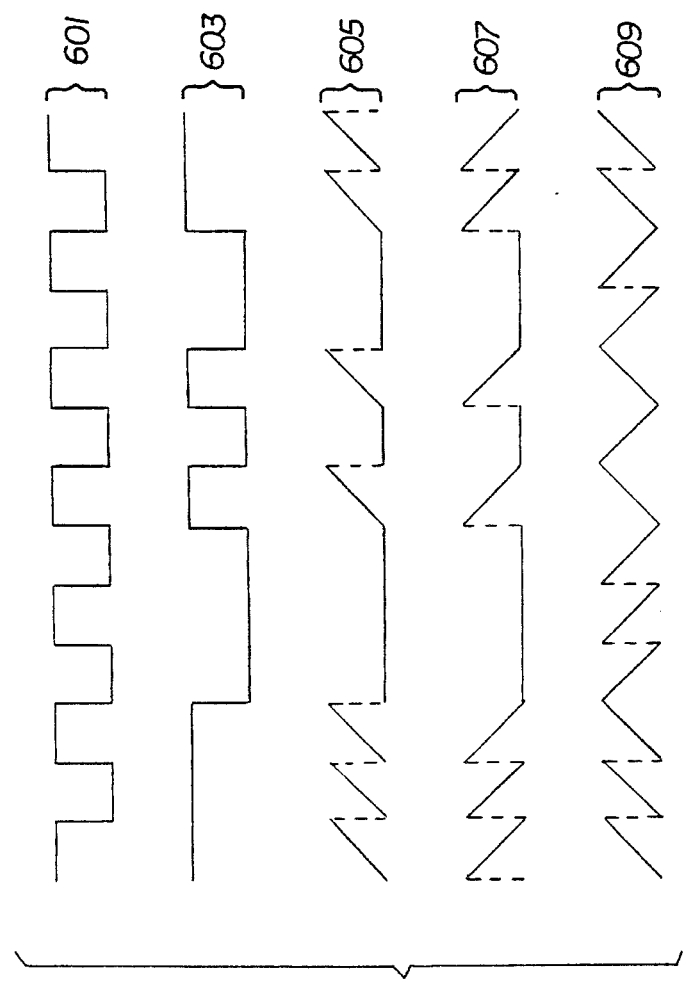
FIG. 6 shows a timing diagram for impressing a data stream onto the system using a series of sawtooth driving waveforms.

FIG. 6 illustrates how the waveform of FIG. 5 may be used to recreate a digital data stream. The waveforms of FIG. 6 include clock 601, data 603, a positive slope sawtooth 605, a negative slope sawtooth 607 and a combination sawtooth 609. An input clock 601 is used to periodically reset the sawtoothed waveforms. In the first method the sawtooth 605 has a positive slope. When the data is at the high level state, the input data waveform 603 is sawtooth modulated with the clock period. When the data is in the lower state the modulation is turned off. The second method uses a similar format, but with a negatively sloped sawtooth waveform 607. The third approach is to use alternating positive and negative sloped composite waveform 609 which depends upon the level state of the data 603 at each clock cycle.

Figure 7:
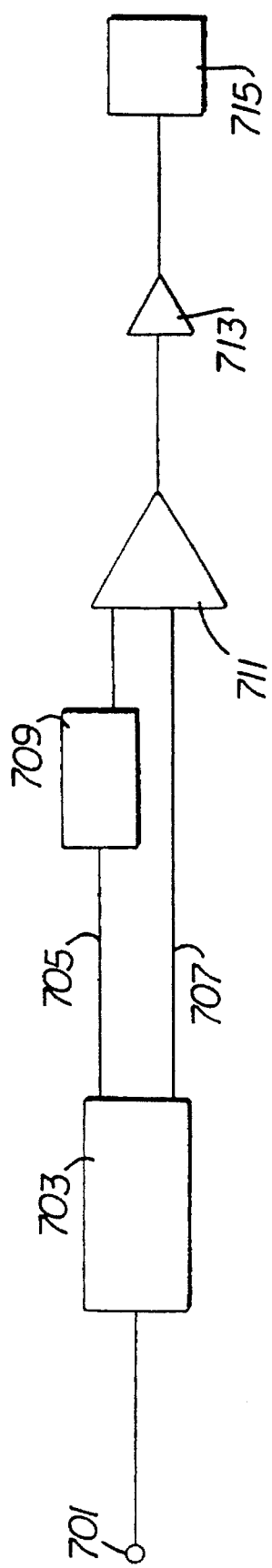
FIG. 7 illustrates an electronics block diagram of circuitry that could be used to support the impression of data onto the system using a sawtooth waveform method.

FIG. 7 shows in block diagram form an electronics set that could be used to format the input data. The input data 701 is fed into a data interface box 703 that formats the output into a clock signal line 705 and an output data stream into a data stream line 707. The clock signal line 705 is fed into an integrator reset circuit 709 while the data stream line 707 is fed into an integrator 711. The integrated output from the integrator 711 is then fed into an amplifier 713 where it is amplified and buffered. The output of amplifier 713 is then fed into a phase modulator 715 which could correspond to the phase modulator 419 of FIG. 4.

Figure 8:
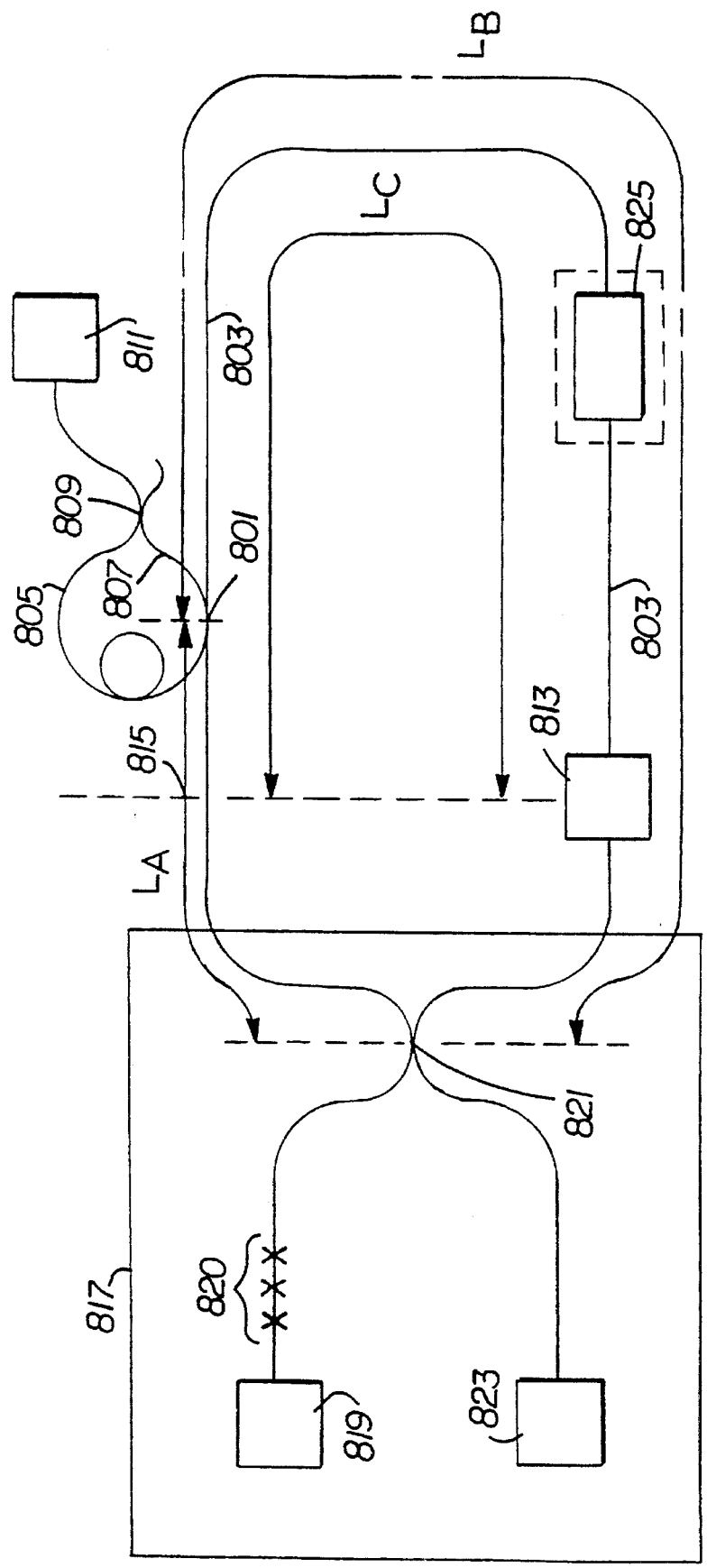
FIG. 8 illustrates a simple intrusion sceanario that requires the intruder to perform pathlength matching.

FIG. 8 illustrates a simple tap of a secure Sagnac interferometer based communications system which consists of a beamsplitter 801 fused into the fiber loop 803. The intruder has a fiber portion 805 to transport light travelling in the counterclockwise direction, with respect to the system being infiltrated, along fiber loop 803 and a fiber portion 807 to transport tapped light travelling in the clockwise direction, with respect to the system being infiltrated, along fiber loop 803. Fiber portions 805 and 807 are connected to a beamsplitter 809. Beamsplitter 809 is connected to a detector 811.

The system into which the intruder is tapping further comprises random (or pseudorandom) pathlength generator 813 along fiber loop 803. Random pathlength generator 813 has a symmetric point 815 on the other side of fiber loop 803, with respect to the midpoint of the loop. The fiber loop 803 extends into the boundary of a receiver 817.

The boundary of receiver 817 encompasses a light source 819 connected through depolarizing element 820 to a central beamsplitter 821. Central beamsplitter 821 is in turn connected back into a detector 823. A transmitter 825 is located along fiber loop 803 displaced from the center thereof with respect to central beamsplitter 821.

The dimension $L_A$ indicates the shorter length from the location 801 of the intruder tap to the central beamsplitter 821. The dimension $L_B$ indicates the longer length from the location 801 of the intruder tap to the central beamsplitter 821. The dimension $L_C$ indicates the length from random pathlength generator 813, through the midpoint of loop 803 to the symmetric point 815.

Once the intruder taped into fiber loop 803 and coupled the counterpropagating light beams into his device, the counterpropagating light beams would then have to be pathlength matched to high accuracy before the signal could be extracted.

For example, a conventional light emitting diode has a coherence length of about 35 microns. For a multikilometer system, the intruder would be faced with the prospect of matching multikilometer lengths to on the order of 30–40 microns. In a system, shown by FIG. 8, the length of fiber length 805 should be matched to the distance $L_A$ and the fiber length 807 should be matched to the distance $L_B$ before the beams are combined on the intruder's beamsplitter 809 if the beams are to interfere to cause an amplitude modulated signal to result on the detector 811. Matching kilometers lengths of fiber to distances on the order of 100 microns is an extremely difficult and time consuming task. The situation is analogous to looking for a needle in a haystack, and in many cases even the simplest system without the random pathlength generator 813 may provide sufficient security.

For additional security the random pathlength generator 813 may be added to the system. This has the effect of randomly (or more accurately pseudorandomly) changing the pathlength of one of the fiber legs such as $L_B$. $L_B = L_{BO} + L_{(t)}$ where $L_{BO}$ is the nominal length of the fiber leg and $L_{(t)}$ is an arbitrary length function which is introduced at characteristic time intervals. With random pathlength generation, the system becomes much more secure. The situation is analogous to randomly moving the needle throughout the haystack. The potential intruder is then faced with the formidable task of trying to achieve a very tight matching condition that is constantly changing. The receiver 817, however, resets quickly after a random pathlength charge is introduced.

In the case of a random pathlength generator 813 located in the fiber loop, the Sagnac interferometer of the secure communication system resets itself due to its self matching characteristics in a time interval given by $L_c n/c$ where $L_c$ is the length of the fiber loop between the random pathlength generator 813 and the symmetry point 815 on the fiber loop 803 and opposite the central fiber beamsplitter 821. For a length $L_C$ of 20 kilometers, the system resets itself in about $10^{-4}$ seconds. Over this time interval information may not be transmitted to the receiver 817 as the resulting combined beams will not be mutually coherent due to the random pathlength introduction. If the random pathlength generator shifts the pathlength at a 100 Hz rate for the 20 kilometer example, this would result in about a one per cent loss in potential bandwidth. As an example, for the case where the random pathlength generator 813 is co-located with the transmitter station 825, signal drop out would occur over one of the timing intervals illustrated by FIG. 3. An important case is where the transmitter is located at the center of the loop 803. By locating the random pathlength generator 813 at or near the center of the fiber loop 803 the reset time approaches zero as both counterpropagating light beams arrive simultaneously.

Figure 9:
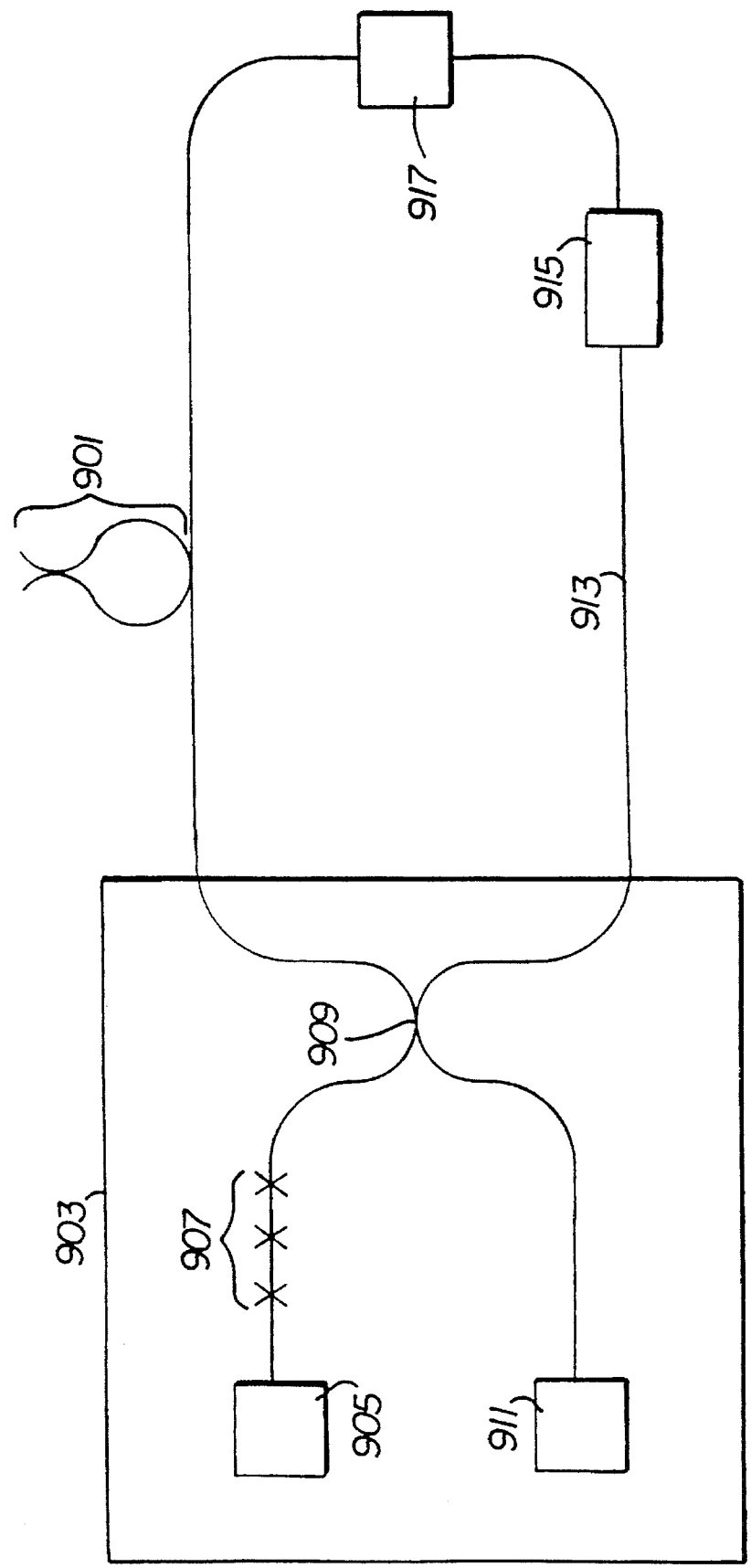
FIG. 9 illustrates a fiber optic communications system with a random pathlength generator.

FIG. 9 shows a secure fiber optic communication system with a simple passive intruder 901, the details of which are similar to that illustrated by FIG. 8. As in FIG. 8, a receiver 903 encloses a light source 905, depolarizing element 907, central beamsplitter 909, and detector 911. A fiber loop 913 connects receiver 903 with transmitter 915, random pathlength generator 917 and passive intruder 901. Here the random pathlength generator is placed in the center of the loop 913 as a special case of the more general description of FIG. 8. Note that the reset time and effect on the output receiver of the system become vanishingly small as the random pathlength generator approaches the true center of the Sagnac loop.

An alternative approach to the use of random pathlength generator 917, yet insuring security against intrusion for a tap with pathlength matching by the intruder, is to use alarm systems based on optical power detectors. The purpose of these types of alarms is to (1) insure that the power level allowed the intruder is so low that useful data may not be extracted and (2) to alert the user of the presence of an intrusion attempt. The figures that follow illustrate several of alarm configurations for the secure fiber optic communication system.

Figure 10:
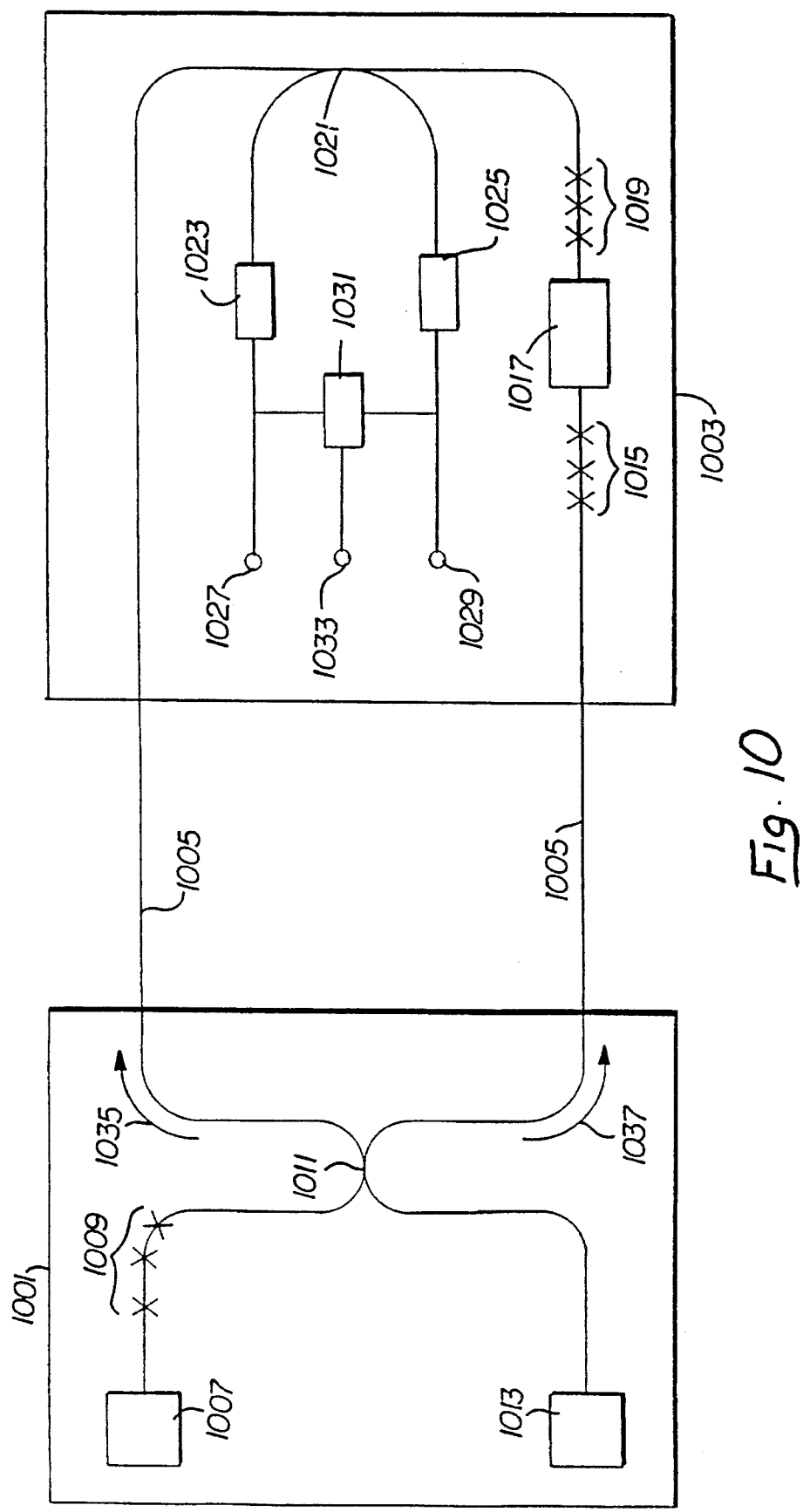
FIG. 10 illustrates a fiber optic communications system with a balanced optical power alarm system.

The system of FIG. 10 consists of a receiver unit 1001 and a transmitter 1003 connected by the pair of fibers 1005. The receiver unit 1001 consists of a light source 1007, a polarization scrambling or depolarizing element 1009, a central fiber optic beamsplitter 1011 and an output detector 1013. The transmitter unit 1003 consists of a polarization scrambler 1015, a phase modulator 1017, the polarization scrambler 1019 the alarm fiber beamsplitter 1021 which taps into one of the fibers 1005, the alarm output detectors 1023 and 1025 connected directly to beamsplitter 1021, and the outputs 1027 and 1029 of alarm output detectors 1023 and 1025 respectively, the ratio transducer 1031 connected to outputs 1027 and 1029, and alarm output 1033 from ratio transducer 1031.

Light from the light source 1007 is coupled into the polarization scrambler 1009 which reduces residual polarization dependence of the light beam, The depolarized light beam is split by the central fiber optic beamsplitter 1011 into the counterpropagating beams of light travelling in directions 1035 and 1037. The clockwise propagating beam of light propagates in direction 1035 and passes through the connecting fiber 1005 to the transmitter 1003. A portion of the light beam propagating in direction 1035 is tapped off onto the alarm detector 1025, The tapped portion of the light beam falling onto the detector 1025 generates an output signal that is used directly as the output 1029 and as an input to the ratio transducer 1031, The remainder of the clockwise propagating light beam continues to circulate about the Sagnac loop of fibers 1005 passing through the polarization scrambler 1019, the phase modulator 1017 and the polarization scrambler 1015, The purpose of the polarization scramblers 1019 and 1015 before and after the phase modulator 1017 is to reduce any polarization dependent effects that the phase modulator 1017 may have upon either of the counterpropagating light beams, The clockwise propagating light beam then returns via the fiber optic link 1005 to the central fiber optic beamsplitter 1011 where it mixes with the counterclockwise propagating light beam of direction 1037 to form the output amplitude modulated signal of the system that is directed toward the output detector 1013. The counterclockwise propagating light beam travelling in direction 1037 traverses the Sagnac loop formed by fiber optic link 1005 in the opposite direction passing the same elements. The main difference is that when the alarm system beamsplitter 1021 taps off a portion of the light of the counterclockwise light beam, the tapped portion is directed to the detector 1023. The resultant output from the detector 1023 is monitored directly and also used as an input to the ratio transducer 1031. There are a number of advantages to this alarm system approach and the Sagnac secure communication system when configured in this manner. The first advantage is that barring environmenal fluctuation in the transmissive properties of the optical components in the Sagnac loop, the ratio of optical power between the light beams circulating about the loop remains fixed. This results in a very stable signal and the tolerances on the resulting ratioed alarm output 1033 can be maintained to high levels. This makes it difficult to intrude on the exposed portions of the Sagnac loop without triggering a properly configured ratioed alarm system. The second major feature of this configuration is that since the fiber beamsplitter 1021 is a single element and highly reciprocal, any environmental fluctuations in this element would not be expected to strongly effect the resulting output ratioed signal 1033.

The limitations of the configuration shown in FIG. 10 are mainly due to environmentally induced loss changes in components in the Sagnac loop formed by fiber optic link 1005. In particular the phase modulator 1017, which may be a pigtailed integrated optical device, may have optical losses that are temperature, pressure, polarization, and wavelength dependent. To circumvent this limitation the configuration shown in FIG. 11 may be used.

Figure 11:
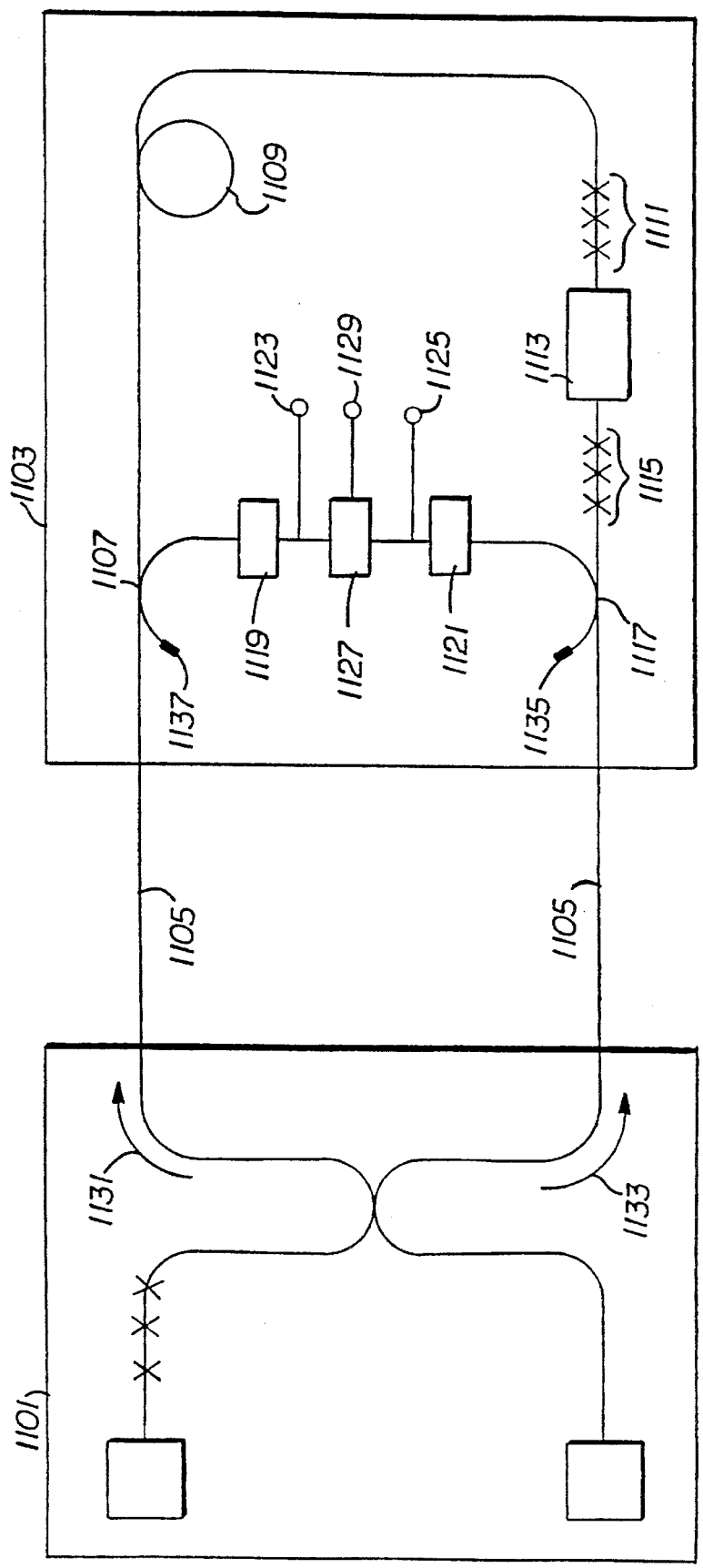
FIG. 11 illustrates a secure fiber optic communication system with a modified balanced alarm system and a wavelength passband filter.

In FIG. 11, the receiver 1101 is identical to the receiver 1001 of FIG. 10. The transmitter 1103 is connected to the receiver 1101 by the fibers 1105. The transmitter section 1103 contains a dual alarm system tap. A fiber beamsplitter 1107, a wavelength passband filter 1109, a polarization scrambling element 1111, the phase modulator 1113, the polarization scrambling element 1115, and the fiber beamsplitter 1117 are located along the main Sagnac light path. The alarm system detectors 1119 and 1121 are connected to beamsplitters 1107 and 1117, respectively. Detector 1119 has an output 1123. Detector 1121 has an output 1125. Outputs 1123 and 1125 are connected to a ratio transducer 1127 which has a ratio output 1129.

The operation of the secure fiber optic communication link as shown in FIG. 11 is as follows. The receiver 1101 generates the counterpropagating light beams which travel in direction 1131 and 1133. The clockwise propagating light beam circulates about the Sagnac loop in direction 1131 and after entering the transmitter 1103 passes the first fiber beamsplitter 1107, the first alarm system tap. A portion of the clockwise propagating light beam is split off or coupled by the tap 1107 and propagates to the alarm system detector 1119. The output from the detector 1119 both constitutes the direct alarm system output 1123 and as an input fed into the ratio transducer 1127. The main portion of the clockwise propagating light beam continues to circulate about the Sagnac loop and next passes the wavelength passband filter 1109. The function of the wavelength passband filter is to ensure that the only wavelengths of light that will be permitted to propagate through the Sagnac loop are the ones that can be monitored by the alarm system detectors 1119 and 1121. The clockwise propagating light beam then passes the polarization scrambling element 1111, phase modulator 1113 and polarization scrambling element 1115 before reaching the second fiber optic beamsplitter 1117. In this configuration a portion of the clockwise propagating light beam is tapped off to the terminated fiber optic end 1135 which is arranged to avoid back reflection. The main portion of the clockwise propagating light beam then returns to the receiver 1101. The counterclockwise circulating optical light beam travelling in direction 1133 traces a path about the Sagnac loop in the opposite direction. The fiber beamsplitter 1117 taps a portion of the counterclockwise propagating light beam 1133 off to the detector 1121. The output from the detector 1121 is both used as a direct output 1125 and as an input fed into the ratio alarm circuit 1127. When the counterclockwise propagating light beam reaches the fiber optic beamsplitter alarm system tap 1107 a portion of the light beam is split off and directed to a terminated end 1137 configured to avoid back reflection. The main portion of the counterclockwise propagating light beam then returns to the receiver 1101. In place of the terminated ends 1135 and 1137, a redundant alarm system having additional direct detection and ratioed alarm outputs could be used. This redundent systems stability would however be subject to environmentally induced loss fluctuations of the elements 1115, 1113, 1111, and 1109, and which could limit its utility.

Figure 12:
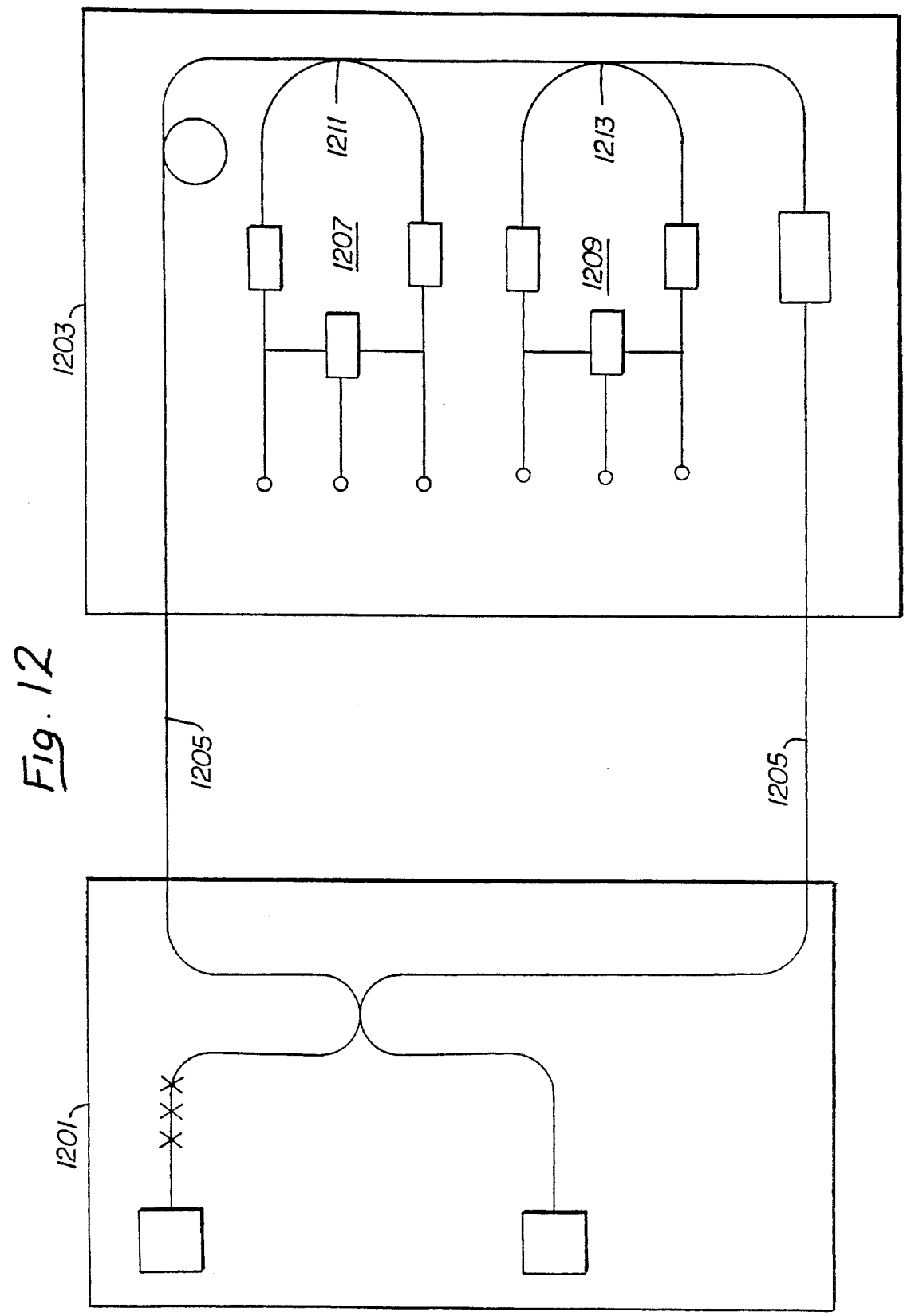
FIG. 12 illustrates a secure fiber optic communications system with a multispectral balanced optical power alarm system in series with the transmitter phase modulator.

The alarm systems described in association with FIGS. 10 and 11 are total power dependent alarm systems. This means that they are configured to monitor fluctuations in optical power circulating about the Sagnac loop. An alterative approach includes the monitoring of the spectral content of the light circulating about the Sagnac loop. FIG. 12 illustrates one configuration of such a spectral alarm system. Here the receiver 1201 and connecting fibers 1205 are similar to those described in the earlier FIGS. The transmitter 1203 is similar to that of transmitter 1003 of FIG. 10 except that here there are two pairs of ratioed alarm systems 1207 and 1209.

The ratioed alarm system 1207 is designed to use a wavelength division multiplexing fiber beamsplitter 1211 that covers a portion of the spectrum of the light circulating through the fiber loop. The ratioed alarm system 1209 is designed to use a wavelength division multiplexing fiber beamsplitter 1213 that is designed to cover another portion of the spectrum of the light circulating through the fiber loop. Together the two ratioed alarm systems 1207 and 1209 are designed to cover the entire spectrum of light circulating through the system. They are also designed to be overlapped on only a portion of the total spectrum. This presents the intruder with the prospect of having to spectrally control a tap as well as total power.

Figure 13:
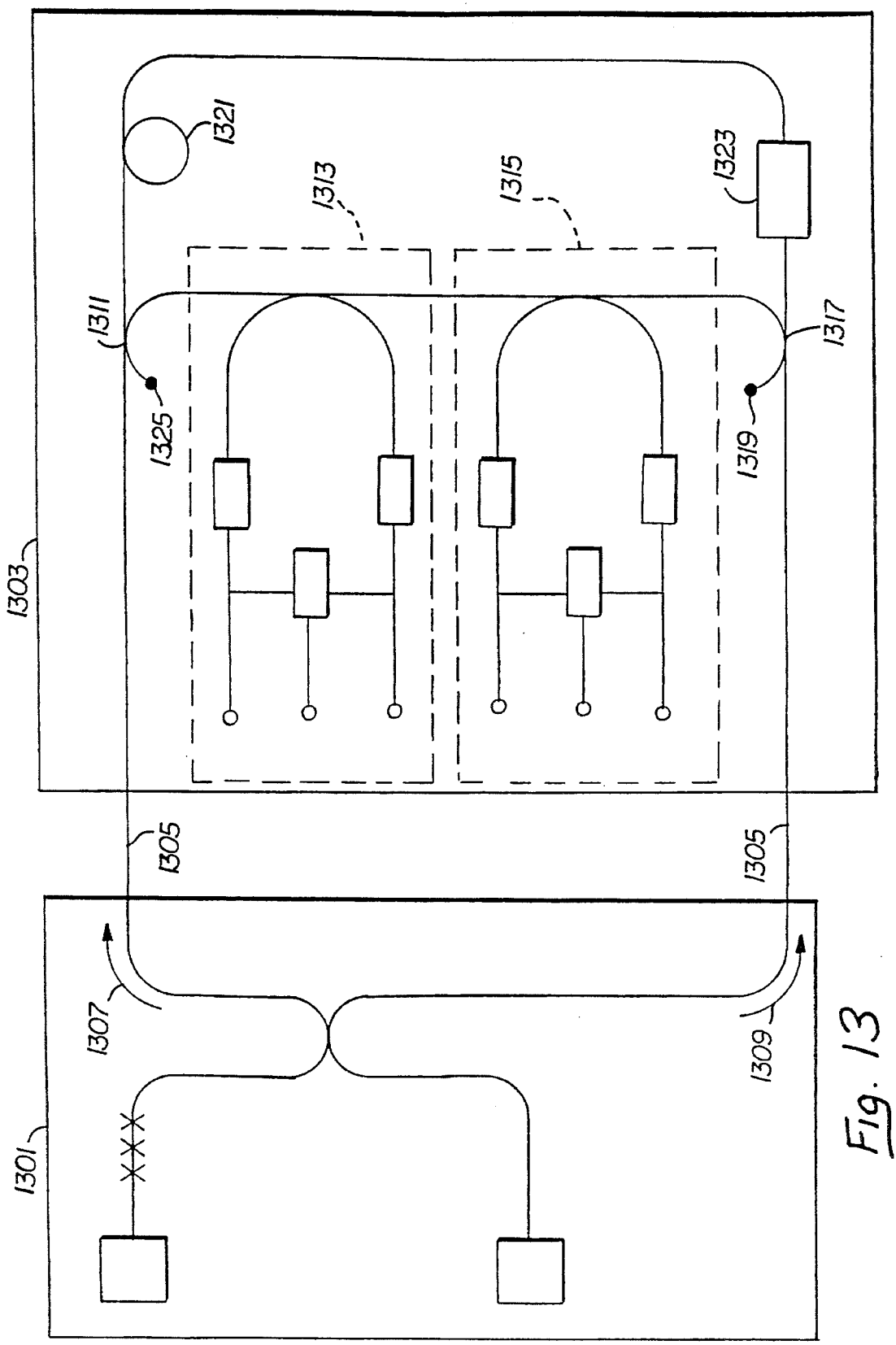
FIG. 13 illustrates a secure fiber optic communication system with a multispectral balanced optical power alarm system in parallel to the transmitter phase modulator.

FIG. 13 illustrates a system based on ratioed spectral alarms. The receiver 1301 is connected to the transmitter section via the fiber optic cable 1305. The receiver unit 1301 is similar to those described in association with FIGS. 10 to 12, as are the connecting fibers 1305. The transmitter section 1303 combines the bypass features described in association with FIG. 11 with the ratioed spectral alarm systems of FIG. 12. In particular the receiver 1301 generates the counterpropagating light beams which travel in direction 1307 and 1309. The clockwise propagating light beam of direction 1307 circulates to the transmitter 1303, and upon entering passes the fiber beamsplitter 1311 of the alarm system tap where a portion of the light beam is coupled off and directed past the ratio spectral alarm units 1313 and 1315 whose boundaries are set off by dashed lines. Spectral alarm units 1313 and 1315 are set up to selectively split off in wavelength bands centered about wavelength 1 and wavelength 2 and are designed to cover the entire spectrum of light propagating through the system. The residual light beam that passes by the alarm systems 1313 and 1315 then passes through the fiber beamsplitter 1317 of the alarm system tap where the light beam is again split into a portion being directed to a terminated end 1319 and a portion directed via the fibers 1305 back to the receiver 1301. In general, the light that is tapped off by beamsplitter 1311 and 1317 and propagates through the alarm system bypass to return to the receiver can be made very small. The beamsplitter 1311 and 1317 will generally be designed to tap a small fraction of the light circulating about the Sagnac loop. In addition, the spectral ratioed alarm systems 1313 and 1315 can be arranged to tap off most of the optical power directed through the bypass. The main portion of the clockwise propagating light beam that does not pass through the alarm bypass output part of beamsplitter 1311 is directed through the wavelength passband filter 1321 and the phase modulator 1323. When passing the beamsplitter 1317, a portion of the clockwise propagating light beam returns to the receiver 1301 and a portion is split off to the terminated end 1319. The counterclockwise light beam of direction 1309 propagates about the loop in the opposite direction in a similar manner through the same elements. One port of beamsplitter 1311 ends in a termination 1325 so that the portion of the counterclockwise propagating light beam that circulates through the system will exit the system instead of returning to the receiver 1301.

Figure 14:
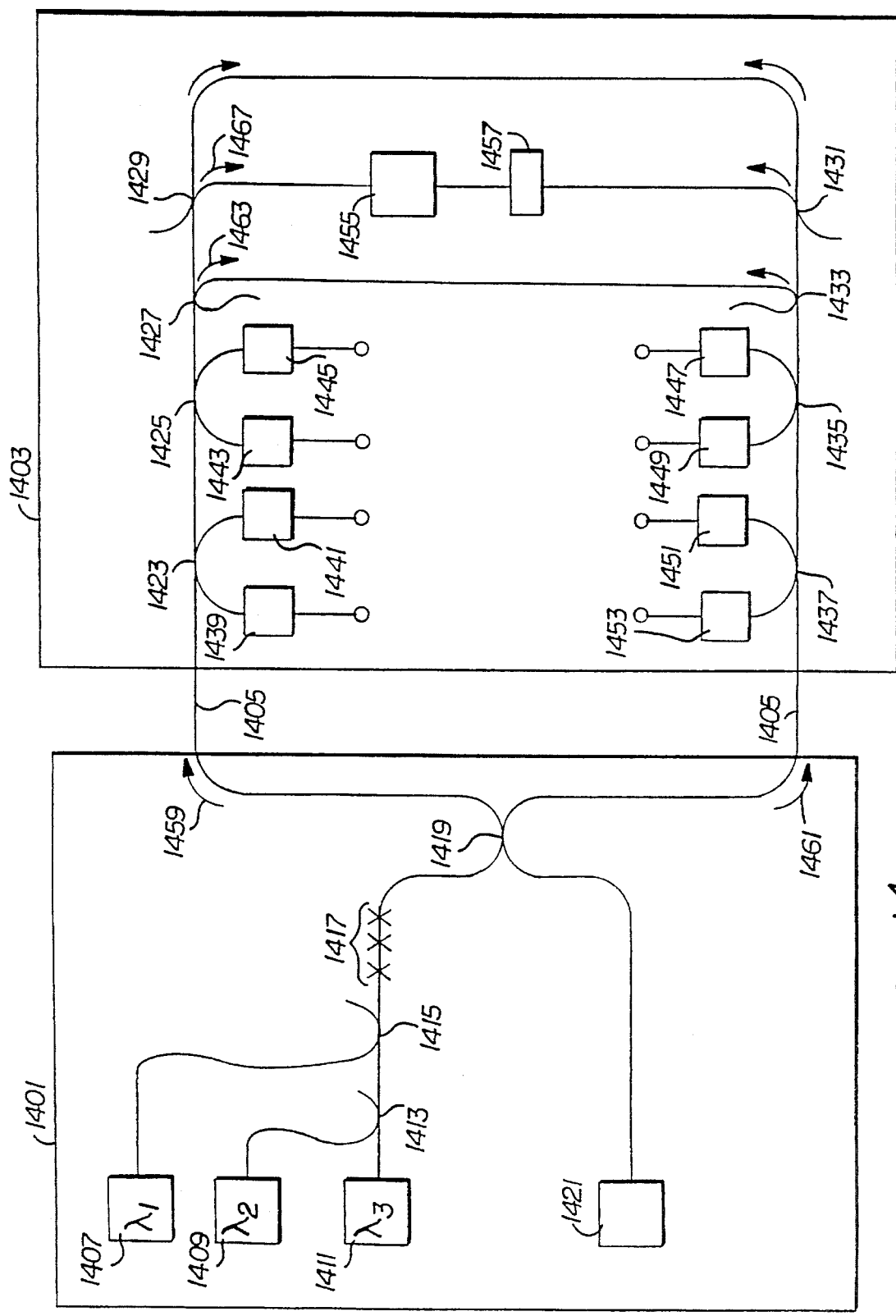
FIG. 14 illustrates a secure fiber optic communications system utilizing multispectral light sources in combination with a multispectral alarm system at the transmitter, and wavelength division multiplexed optical paths to isolate the transmitting phase modulator.

FIG. 14 illustrates a system based on the used of multiple wavelength light sources, multiple ratioed alarm systems and multiple wavelength Sagnac loops to increase the difficulty of intrusion attempts. The system consist of the receiver 1401, connecting fibers 1405 and the transmitter unit 1403. The receiver unit 1401 consists of three light sources 1407, 1409 and 1411 operating at three distinct wavelengths lamda 1, lamda 2 and lamda 3 respectively, the wavelength division multiplexing beamsplitters 1413 and 1415, the depolarizing element 1417, the central fiber optic beamsplitter 1419 and the output detector 1421. The transmitter 1403 consists of the wavelength division mulitplexing fiber beamsplitters 1423, 1425, 1427, 1429, 1431, 1433, 1435, and 1437, the detectors for the ratioed alarm system 1439, 1441, 1443, 1445, 1447, 1449, 1451 and 1453, the phase modulator 1455 and random pathlength generator 1457.

FIG. 14 is a diagram of a multispectral alarm system for the Sagnac interferometer based secure fiber optic communication system. Light from three light sources 1407, 1409 and 1411 operating at the wavelengths lamda 1, lamda 2 and lamda 3 are coupled into the fiber depolarizer 1417. Light from the light source 1411 is coupled with light from the light source 1409 via wavelength division beamsplitter 1413. Light from the light source 1407 is coupled with light from wavelength division beamsplitter 1413 at wavelength division beamsplitter 1415. The resulting three wavelength light beam is then coupled to the fiber depolarizer 1417.

The resulting three color light beam is split into the counterpropagating light beams having a clockwise direction 1459 and a counterclockwise direction 1461 by the central beamsplitter 1419. As the clockwise propagating light beam of direction 1459 passes the wavelength division multiplexing beamsplitter 1423, a portion of the light beam having the third wavelength lamda 3 is split off onto detector 1441. Then as the clockwise propagating light beam passes the wavelength division mutiplexing beamsplitter 1425, a portion of the light having the first wavelength lamda 1 is split off and propagates onto the detector 1445.

The remainder of the clockwise propagating light beam of direction 1459 proceeds to the wavelength division multiplexing beamsplitter 1427. The wavelength division multiplexing beamsplitter 1427 selectively routes the clockwise propagating light beam light having a wavelength lamda 3 down path 1463, and is routed back into the Sagnac loop by the wavelength division multiplexing element 1433. The light beam having a wavelength lamda 3 then passes the wavelength division multiplexing beamsplitter 1435 and reaches the wavelength division multiplexing beamsplitter 1437 where a portion of the light beam is directed to the alarm detector 1453. The remainder of this light beam having wavelength lamda 3 returns to the receiver 1401 via the fiber 1405, and then reaches the central fiber optic beamsplitter 1419 where it recombines with the counterclockwise counterpropagating portion of the light beam having a wavelength lamda 3 of direction 1461. Since data is not impresses on the lamda 3 light beams the resultant signal from the combined beams at this wavelength corresponds to a slowly varying ambient light level at this wavelength.

Referring back to the upper right portion of transmitter 1403, light having wavelengths lamda 1 and lamda 2 leave wavelength division multiplexing beamsplitter 1427 and propagate to wavelength division multiplexing beamsplitter 1429 where light having wavelength lamda 2 is routed away from light having a wavelength lamda 1. The light beam having wavelength lamda 2 is routed in direction 1467 through the phase modulator 1455 and through a random pathlength generator 1457 before being returned to the Sagnac loop by the wavelength division multiplexing beamsplitter 1431. The light beam having a wavelength lamda 2 then passes the wavelength division multiplexing beamsplitters 1435 and 1437 as it returns to the receiver 1401. Inside the receiver 1401 the lamda 2 light beam falls onto the central fiber optic beamsplitter 1419 where it combines with the circulating portion of the counterclockwise counterpropagating lamda 2 light beam. Since the phase modulator 1455 has been used to impress data onto these counterpropagating lamda 2 light beams in terms of a relative phase difference, the two light beams interfere and recreate the impressed data in terms of an amplitude modulated signal that is directed toward the output detector 1421.

Again, back to the upper right hand portion of the transmitter 1403, light having a wavelength lamda 1 propagates in direction 1469 as it circulates about the bypass to the wavelength division multiplexing element 1431 where it is recoupled to the Sagnac loop. The lamda 1 light beam then passes the wavelength division multiplexing element 1433, and reaches the wavelength division multiplexing beamsplitter 1435. At this point, a portion of the lamda 1 light beam is tapped off to the alarm detector 1449. The remainder of the lamda 1 light beam passes the wavelength division multiplexing beamsplitter 1437 and returns to the central fiber optic beamsplitter 1419. There the clockwise propagating lamda 1 light beam recombines with the portion of the counterclockwise counterpropagating lamda 1 light beam. Like the lamda 3 light beams, these beams again do not contain information and are strictly in place for alarm detection purposes. The counterclockwise light beam of direction 1461 propagates through the system in the opposite direction in analogous fashion. By selecting the "guard band" wavelengths higher and lower than the carrier wavelength, intrusion attempts are made more difficult. The Sagnac interferometer approach offers the adavantage of being able to employ ratio alarms that can be used in redundant fashion and with great stability to enhance the overall security of the system.

Figure 15:
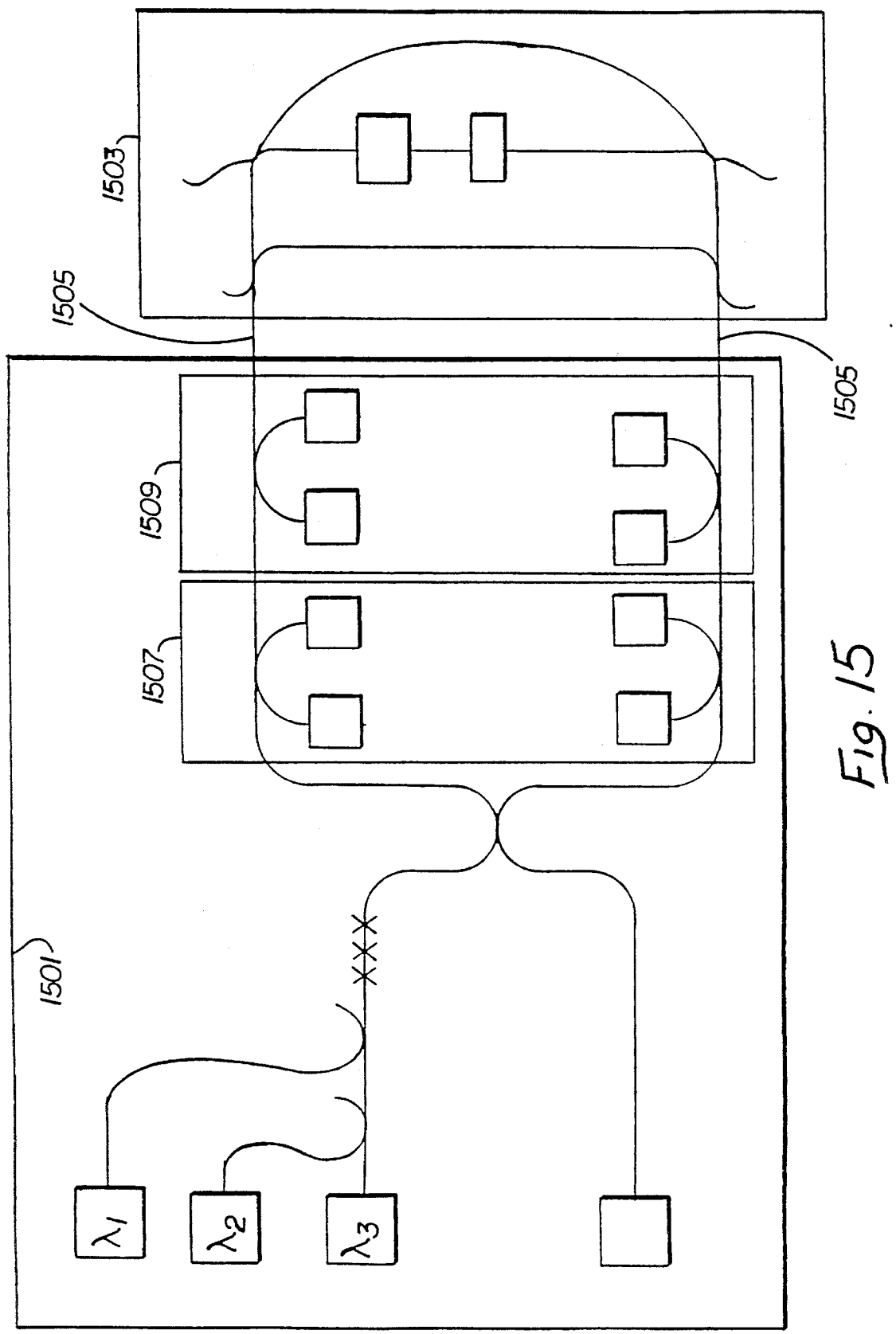
FIG. 15 illustrates a system similar to that shown in FIG. 14, with the multispectral alarm system located with the receiver.

FIG. 15 shows a multispectral alarm system that is essentially identical to that of FIG. 14. The major difference is that the ratio alarm systems have been moved from the transmitter section to the receiver section. In particular the receiver 1501 and transmitter 1503 are identical to those of FIG. 14. Now, the receiver 1501 contains the ratio alarms 1507 and 1509. The transmitter 1503 here has its ratio alarm systems removed. The fibers 1505 interconnect the transmitter 1503 and receiver 1501. The change in location of the ratio alarm systems does not affect operation, and operation is identical to that described for FIG. 15.

Figure 16:
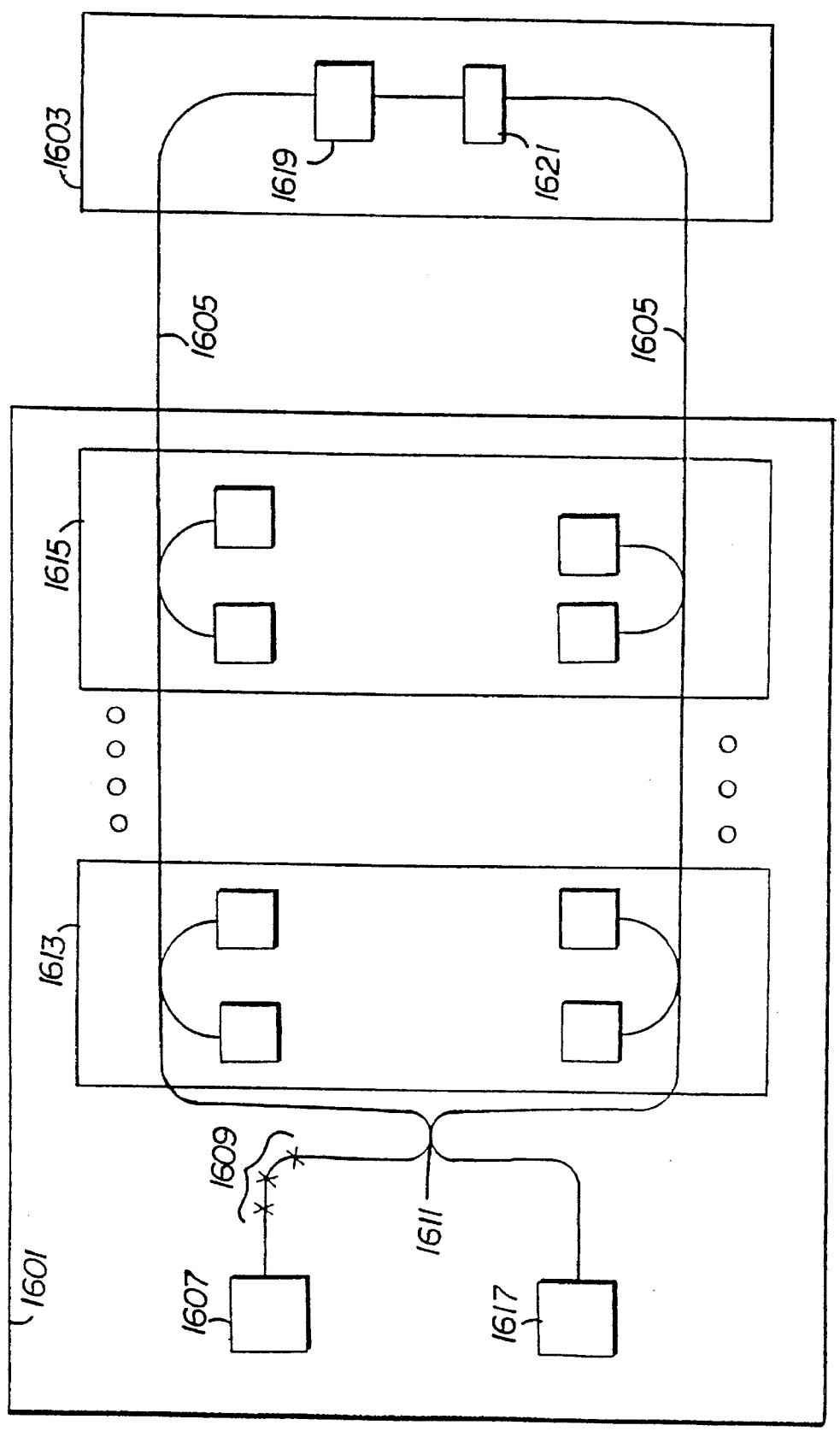
FIG. 16 illustrates a secure fiber optic communications system utilizing a single broadband light source in combination with a ratioed multispectral alarm system located at the receiver.

An alternative multispectral alarm approach is shown in FIG. 16. Rather than use multiple distinct light sources, a single broadband light source is employed. The broadband light coupled into the system propagates around a single Sagnac loop. The alarm system consists of a series of appropriately spaced wavelength division multiplexing beamsplitters which collectively are capable of diverting wavelengths of light covering the entire spectral range of the broadband light source. This design is used in a ratio alarm format to take advantage of the self referencing properties of the Sagnac interferometer.

Figure 17:
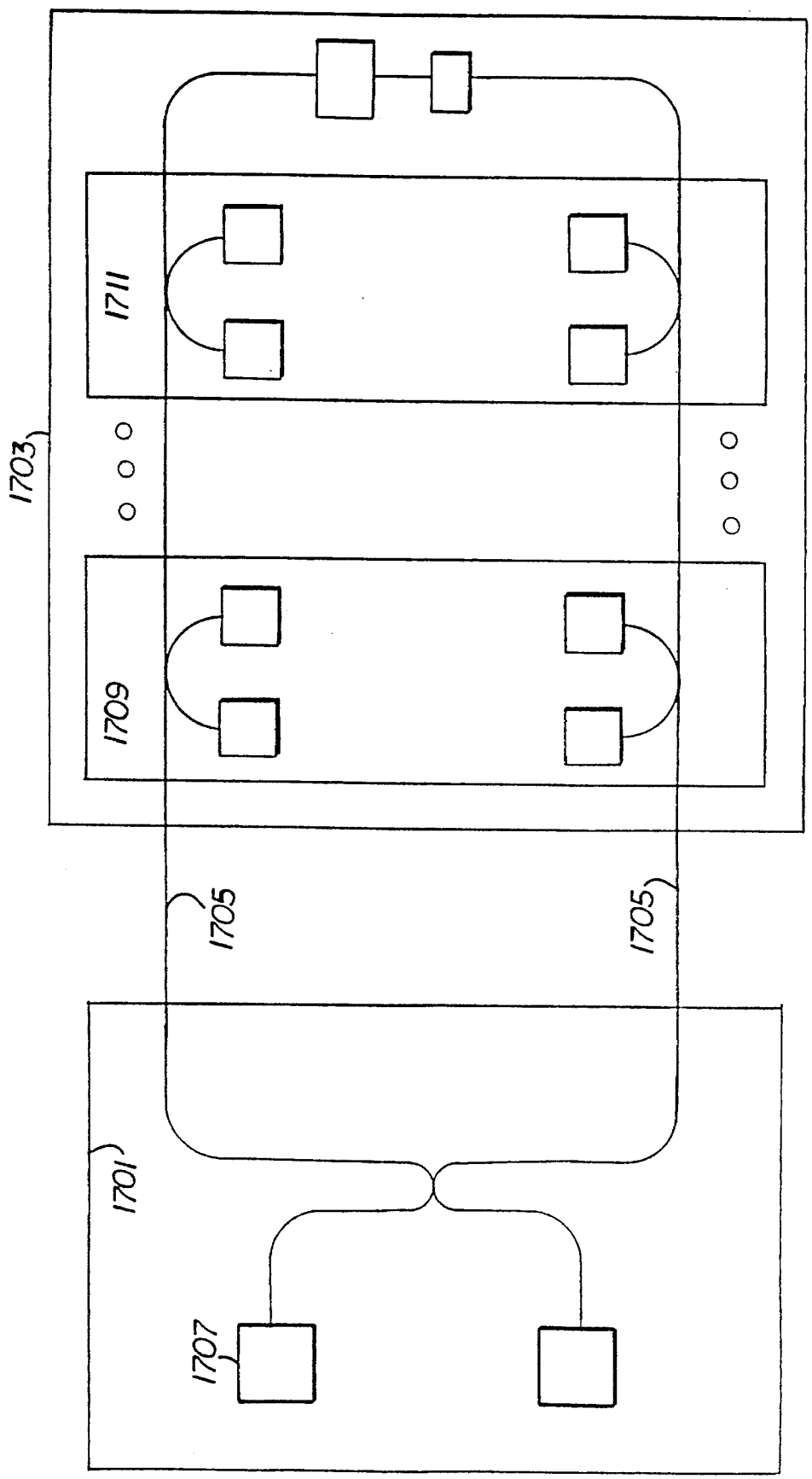
FIG. 17 illustrates a secure fiber optic communications system similar to that of FIG. 16 but with the ratioed multispectral alarm system located at the transmitter.

The system consists of a receiver 1601 and a transmitter 1603 interconnected by a pair of optical fibers 1605. The receiver 1601 consists of a broadband light source 1607 a depolarizing element 1609, a central fiber optic beamsplitter 1611, a series of several ratioed spectral alarm systems represented by a bilateral set or pair of spectral alarm systems 1613 through 1615, and an output detector 1617. The transmitter 1603 consists of the phase modulator 1619 that is offset from the center of the Sagnac loop with respect to central beamsplitter 1611 and a passband filter 1621 that is optimized for transmission of wavelenghts output by the broadband light source 1607 and handled by the multispectral ratio alarm system, and optimized for attenuation of all other wavelengths. The passband filter 1621 may be, for example, an dispersive optical filter. An dispersive optical filter is made of a fiber with highly dispersive core and which has cladding regions which change waveguiding characterisitics as a function of wavelength. Alternatively, any of several optical passband filters described in the literature may be used for passband filter 1621. The operation of this system is similar to that described in association with the earlier figures. The ratioed alarm system as configured in the embodiment of FIG. 16 has the advantage of monitoring the spectral content of very narrow regions of the light circulating in the Sagnac loop. Potentially an increasingly larger number of these systems could be used resulting in concomitantly increasing security. An additional feature of this system includes the ability to monitor the collective spectral content of the light source being monitored and ratioed by the alarm system. Since the Sagnac loop provides a reference, the ratio alarms will not be triggered by spectral drift of the light source, The system is also independent of the length of the link since a ratio established after connection remains fixed, FIG. 17 illustrates a system similar to that shown in FIG. 16, but here the multispectral ratioed alarm system moved to the transmitter section. The receiver 1701, transmitter 1703, optical fibers 1705, and multispectral light source 1707 are similar to receiver 1201, transmitter 1203, optical fiber 1205, and multispectral light source 1607 described in FIG. 16. Transmitter 1703 does, however, include the addition of multispectral ratioed alarms 1709 and 1711.

Figure 18:
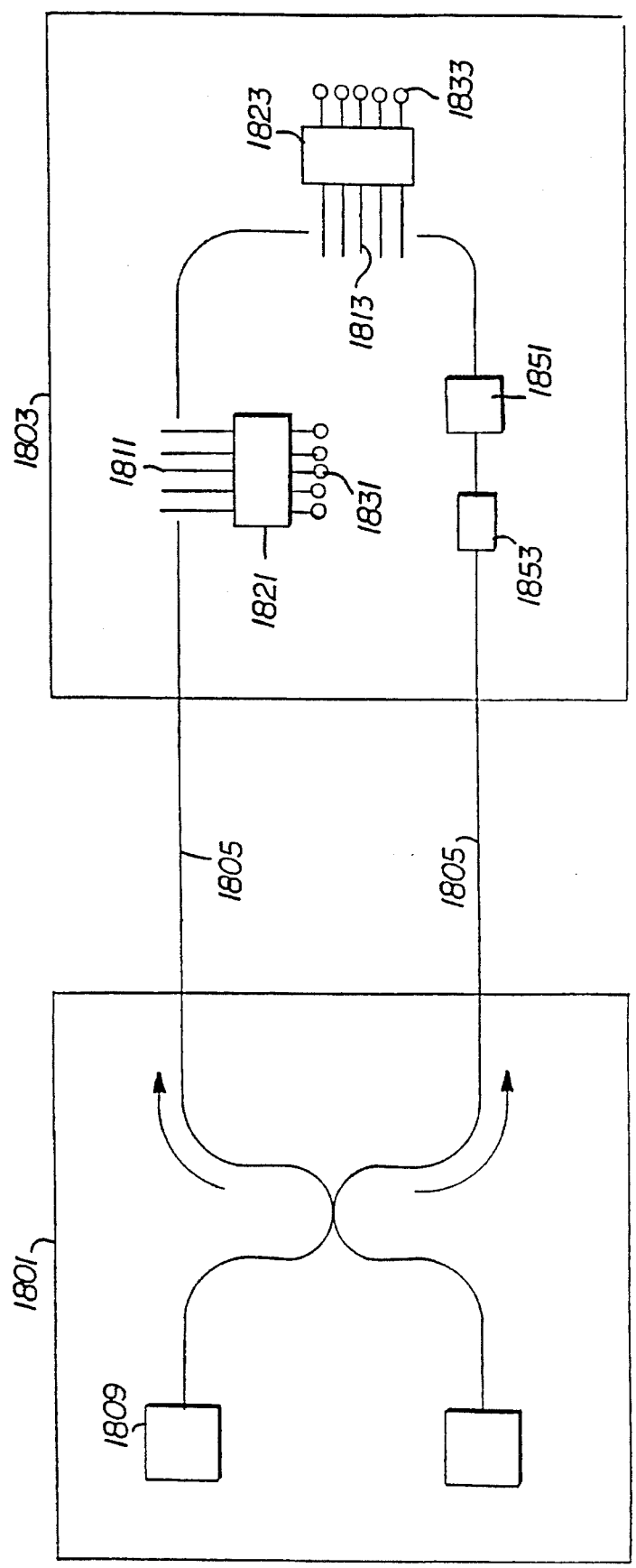
FIG. 18 illustrates a multispectral alarm system with a dispersive elements in combination with detector arrays in a secure fiber optic communication system.

FIG. 18 illustrates the schematic of a system similar to that of FIG 17. In FIG. 18, the multispectral alarm has been replaced by directional dispersive elements and detector arrays. The receiver 1801, transmitter 1803 optical fibers 1805 and multispectral light source 1809 are similar to receiver 1701, transmitter 1703, optical fibers 1705 and multispectral light source 1707 of FIG. 17, Here, transmitter 1803 includes the directional dispersive elements 1811 and 1813, detector array elements 1821 and 1823 and their outputs 1831 and 1833 that are ratioed, as well as a phase modulator 1851 and wavelength passband filter 1853.

The action of a single dispersive element such as dispersive element 1811 in combination with a detector array such as detector array 1821 is to monitor the spectral content of the light source 1809. Unexpected changes in the light content due to an intrusion would activate the alarm. Directional dispersive elements 1811 and 1813, such as grating elements, cause the light spectrum from each of the counterpropagating light beams to become spread onto each of the detector arrays 1821 and 1823, respectively and the result available for ratioed referencing. In this manner very slight perturbations to any portion of the spectral content of light circulating through the system could be detected.

Figure 19:
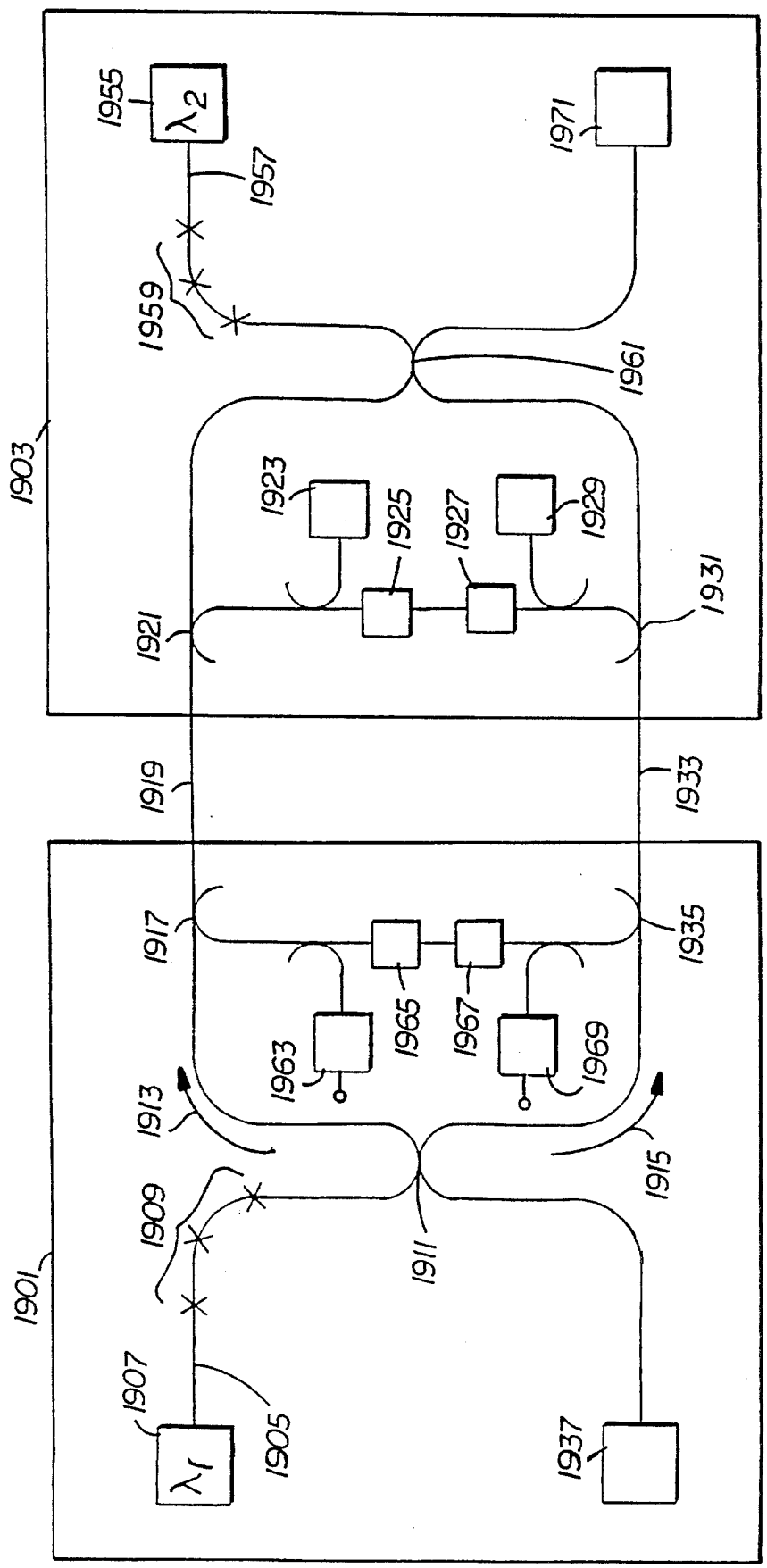
FIG. 19 illustrates a secure fiber optic communications system that is a full duplex system with dual beamsplitter multispectral alarm systems.

FIG. 19 illustrates one embodiment of a full duplex multispectral secure fiber optic communication system. This embodiment uses one of the simplest and most effective methods for a multispectral alarm system. A transceiver unit 1901 is fiber optically connected to a transceiver unit 1903. Light from a light source 1905 with a spectral output centered about lamda 1 is injected into an optical fiber 1907. Light passes through a polarization scrambling element 1909 on its way to beamsplitter 1911. Beamsplitter 1911 splits the polarization scrambled light into counterpropagating light beams which travel in directions 1913 and 1915. Optical beamsplitter 1911 is designed to split the optical power of the light beams centered about lamda 1 approximately equally. The clockwise light beam passes a wavelength division multiplexing element 1917 that is fabricated to pass light centered about wavelength lamda 1 without cross coupling. This process could be accomplished by using a specially fabricated fiber beamsplitter or any other wavelength division multiplexing element such as those based on dispersive elements. After passing through the wavelength division multiplexing element 1917 the clockwise propagating light beam enters on interlink fiber 1919 that acts to connect the transceiver 1901 to the transceiver 1903. After entering transceiver 1903 the light beam is cross coupled by the wavelength division multiplexing element 1921 which is designed to cross couple light and route centered about wavelength lamda 1. The routed light beam then passes a tap and detector unit 1923 which taps off a portion of the light beam for alarm system purposes. The routed light beam then passes through a random pathlength generator 1925 which ideally may be positioned near the center of the Sagnac loop, and is used if necessary to provide additional security as earlier described. The clockwise propagating light beam then passes through a phase modulator 1927 which is used to impress phase information onto the clockwise propagating lamda 1 wavelength light beam for data transmission. The clockwise propagating lamda 1 wavelength light beam then passes through a tap and detector 1929 which is used to monitor the light intensity of the counterpropagating lamda 1 wavelength light beam. The clockwise propagating lamda 1 wavelength light is then cross coupled by the wavelength division multiplexed element 1931 and routed into the interconnecting fiber 1933. The light beam is directed by interconnecting fiber 1933 back to transceiver 1901. The clockwise propagating lamda 1 wavelength light beam then passes through a wavelength division multiplexed element 1935 and back to the fiber beamsplitter 1911.

The counterclockwise lamda 1 wavelength light beam travelling in drection 1915 traverses the optical path just described for the clockwise propagating lamda 1 wavelength light beam, but in the counterclockwise direction. The major distinction in the counterclockwise case is that the tap/detector element 1929 is used to monitor the light beam. The clockwise and counterclockwise lamda 1 light beams interferometrically combine on the beamsplitter 1911 and the resultant modulated signal falls onto an output detector 1937.

The light source 1955 generates a light beam centered about wavelength lamda 2 that is coupled into an optical fiber 1957. After passing a polarization scrambling element 1959 the lamda 2 light beam propagates to fiber beamsplitter 1961. The light beam is split by fiber beamsplitter 1961 into counterpropagaging light beams. Fiber beamsplitter 1961 is designed to split light centered about a wavelength lamda 2 approximately equally for optimum performance. The counterclockwise propagating lamda 2 light beam passes through wavelength division multiplexing element 1921 and the fiber 1919 before being cross coupled and routed away by wavelength division multiplexed unit 1917. The routed counterclockwise propagating lamda 2 light beam is then monitored by a tap/detector 1963 for light intensity level and then passes through a random pathlength generator 1965, a phase modulator 1967, and by a tap/detector 1969. The wavelength division multiplex splitter 1935 cross couples the counterclockwise propagating lamda 2 light beam into the fiber 1933 which directs it back to transceiver 1903 where it passes through the wavelength division multiplexed splitter 1931 and onto the fiber beamsplitter 1961. The clockwise propagating lamda 2 wavelength light beam traverses the optical path of counterclockwise propagating lamda 2 wavelength light beam in the opposite direction with the tap/detector element 1969 monitoring its intensity level. The two beams recombine on fiber beamsplitter 1961 and the resultant signal falls onto an output detector 1971.

Figure 20:
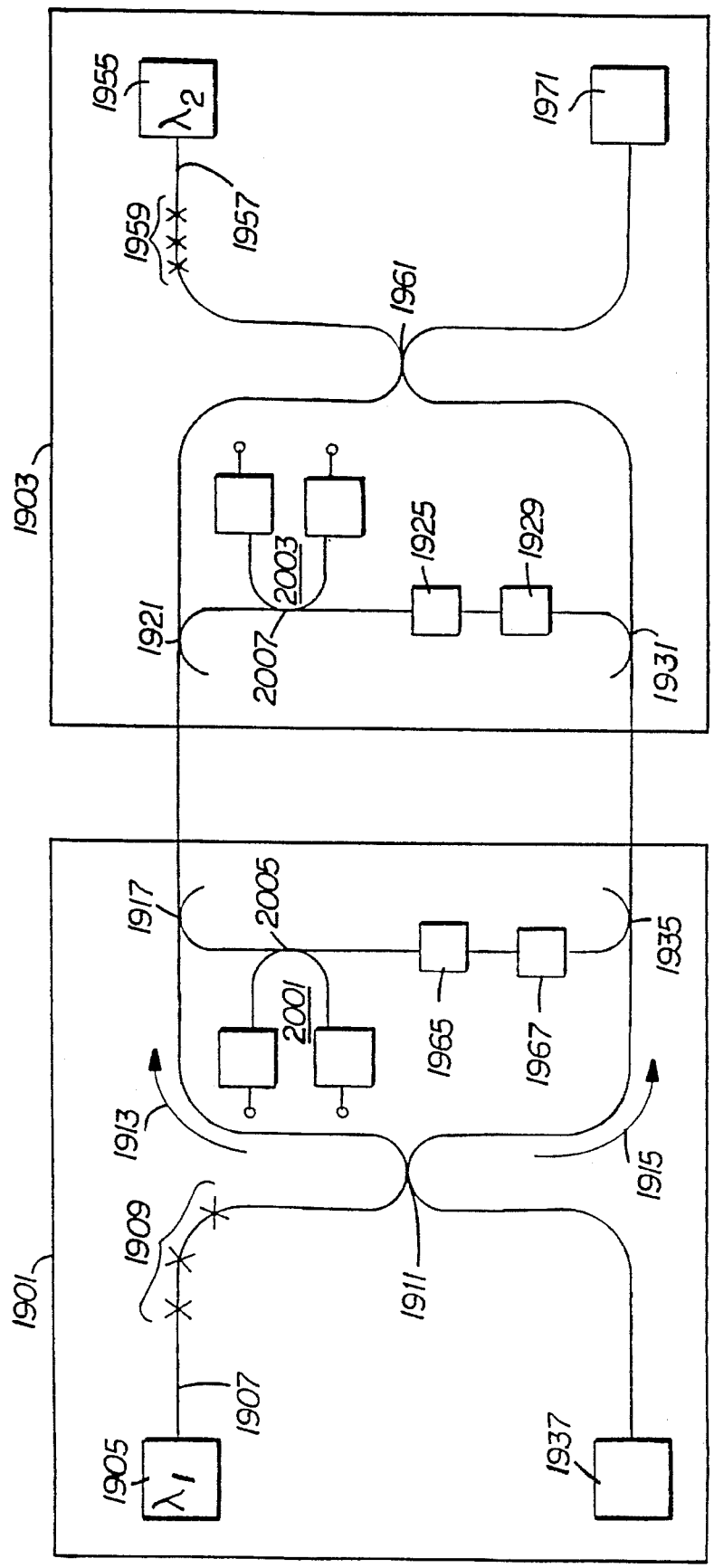
FIG. 20 illustrates a secure fiber optic communication system which supports full duplex operation with a beamsplitter multispectral intensity alarm system.

FIG. 20 is similar to FIG. 19 except that tap/detectors 1963, 1969, 1923, and 1929 have been replaced by the ratioed alarms 2001 and 2003 that use the single fiber beamsplitter taps 2005 and 2007 instead of dual taps.

Figure 21:
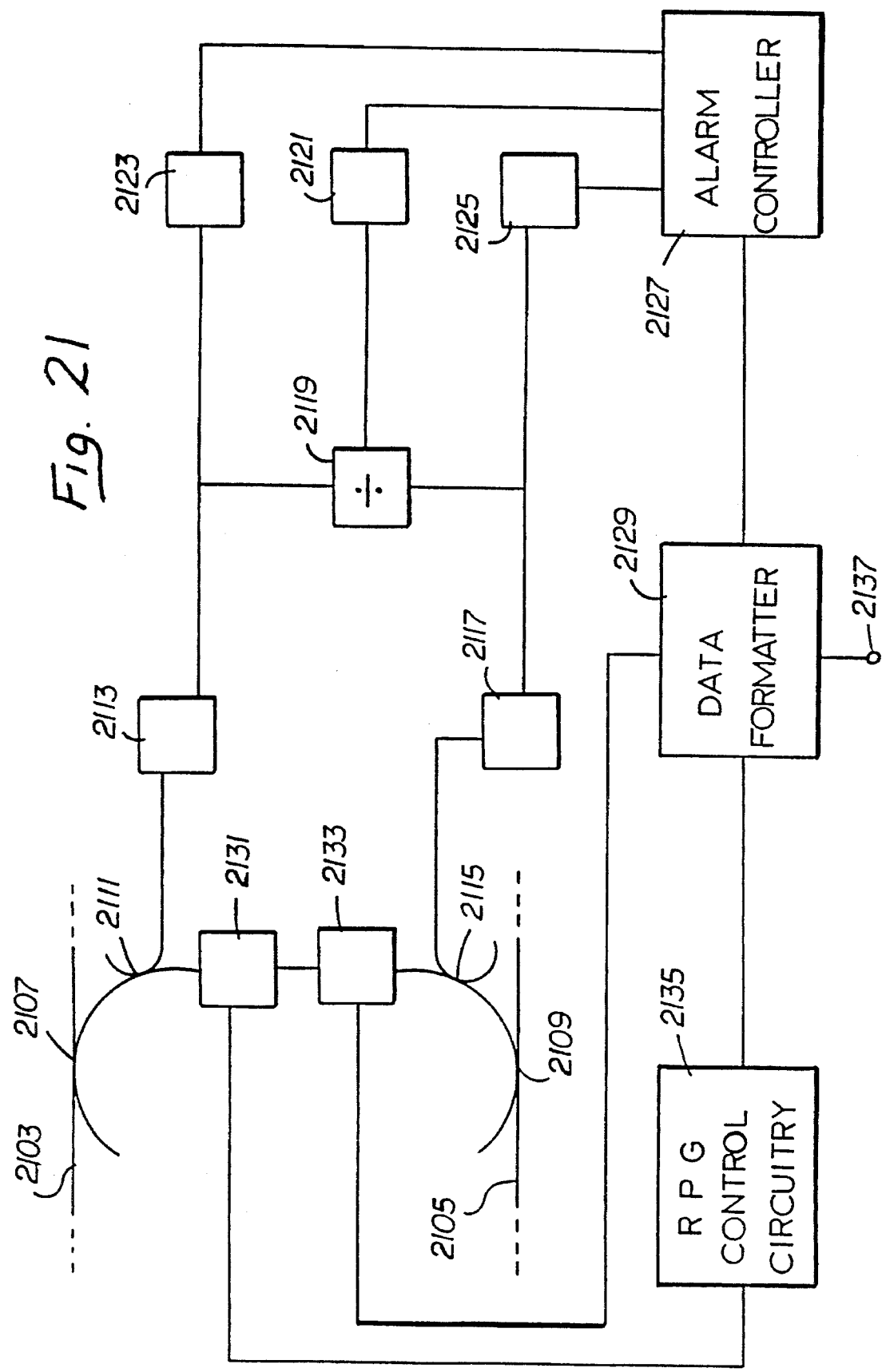
FIG. 21 shows a block diagram of the electronics used to support the transmitter alarm system of FIG. 19.

FIG. 21 shows a block diagram of the electronics supporting the full duplex multispectral secure fiber optic communication system for the transmitter section, a pair of communication lines 2103 and 2105 are available to the optical circuit of FIG. 21. A wavelength division mulitplexing element 2107 is located along communication line 2103, and a wavelength division multiplexing element 2109 is located along communication line 2105, the outputs from a tap 2111 and detector 2113 and from a tap 2115 and detector 2117 are fed into the ratio/divider circuitry 2119 whose output is fed to the normalization circuitry block 2121. The outputs from detectors 2113 and 2117 are fed directly into the normalization circuit blocks 2123 and 2125, respectively. When the system is activiated, these normalization circuit blocks 2121, 2123 and 2125 go through an initialization process wherein the power levels on the detectors 2113 and 2117 are determined. This determined value is used to normalize future outputs as well as their ratio. The outputs from the normalization circuit blocks 2121, 2123 and 2125 are fed into an alarm controller 2127 which shuts down the system by turning off the data stream through connection with a data formatter 2129 if the deviation of the power level from the detectors 2113 and 2117 or their ratio exceeds preset trigger values.

A random pathlength generator 2131 and a phase modulator 2133 are connected in series between taps 2111 and 2115. Random pathlength generator 2131 is electrically connected to a random pathlength generator control circuiting block 2135. Phase modulator 2133 is electrically connected to data formatter 2129. The data formatter 2129 is electrically connected to block 2135. The data is input to the system via an input port 2137 of the data formatter 2129. When the alarm controller 2127 detects that trigger values have been exceeded it shuts down the data formatter 2129 which shuts down the data stream 2137.

Figure 22:
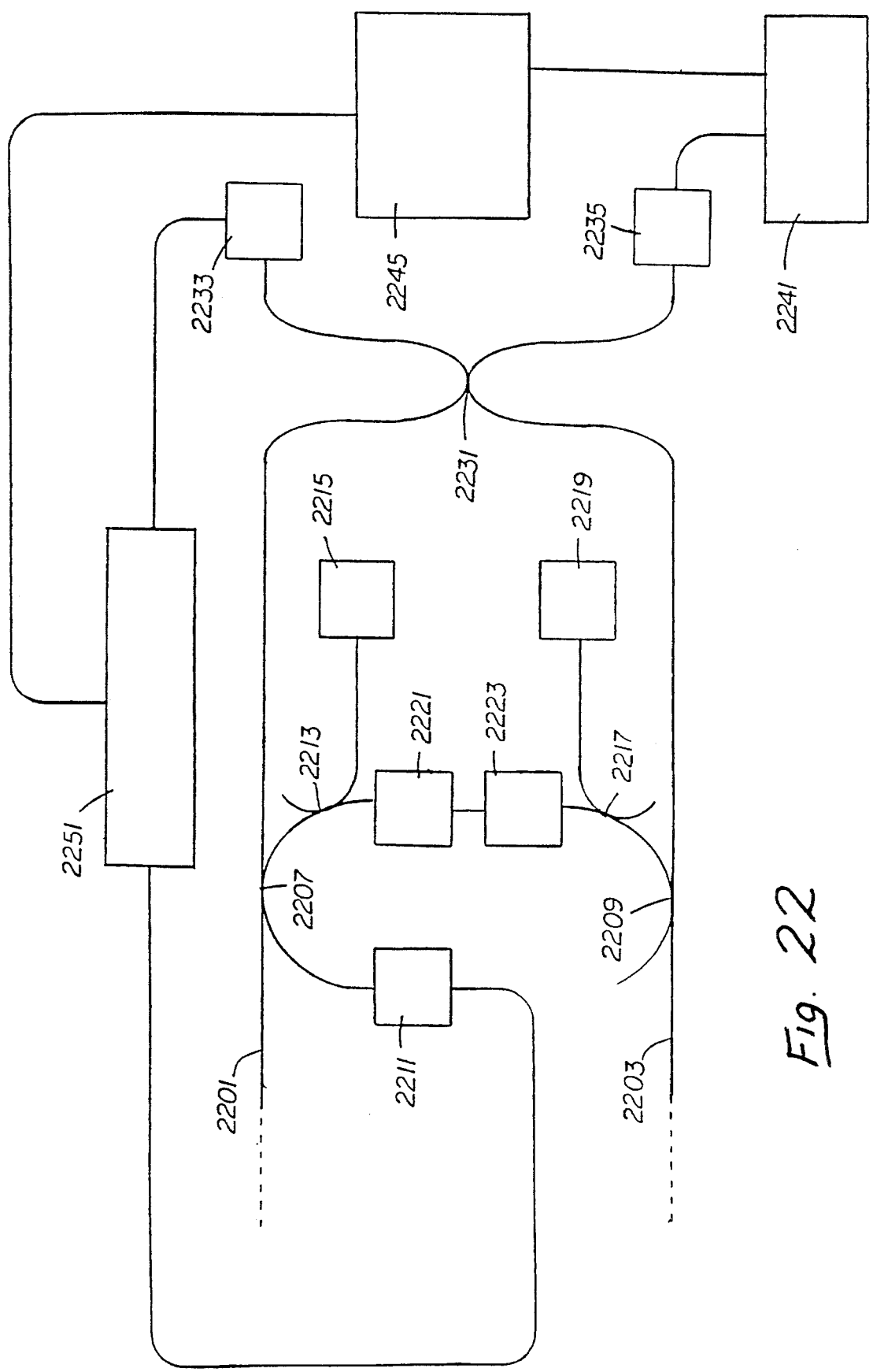
FIG. 22 illustrates a block diagram of the electronics used to support the receiver alarm system of FIG. 20.

FIG. 22 illustrates a block diagram of a possible set of support electronics for the receiver section of the system. The main features of FIG. 22 are the normalization and power controller for the light source. The purpose of this system is to hold the output power coupled into the system as stable as possible enabling the alarm system tolerance to be tight. Referring to FIG. 22, a pair of incoming fiber optic lines 2201 and 2203 enter the FIG. in dashed format from the left-most side. Fiber optic line 2201 and 2203 extend to wavelength division multiplexing elements 2207 and 2209, respectively. Wavelength division multiplexing element 2207 is connected to a detector 2211 on the left, and to a tap 2113 and detector 2215 on the right. Similarly, a wavelength division multiplexing element 2209 is connected to a tap 2217 and detector 2219 on its right extension. In between taps 2217 and 2213 is a random pathlength generator 2221 and a phase modulator 2223 connected in series.

Wavelength division multiplexing elements 2207 and 2209 are also each connected to one of four ports of a central beamsplitter 2231. The third and fourth parts of central beamsplitter 2231 are connected to a light source 2233 and a detector 2235, respectively. Detector 2235 connects into a data formatter 3341. Data formatter 2241 connects to a signal power monitor 2245. Both the signal power monitor 2245 and light source 2233 are connected into a power controller 2251. Power controller 2251 is also connected back into detector 2111.

Power stability is accomplished by having detector 2211 monitor the small amount of light at wavelength to be modulated cross coupled by the wavelength division multiplexing unit 2207. The output of detector 2211 is then fed into a power controller 2251 which adjusts the current to the light source 2233 to control and stabilize the light power injected into the system. Another alarm system contained within the receiving section shown in FIG. 22 consists of signal power monitor 2245 which monitors the signal level of the data received on the detector 2235. This is accomplished directly or in combination with the output data formatter 2241. In the event that the output signal level deviates from expected values, the signal controller would deactivate the light source 2233 via the power controller 2251.

Figure 23:
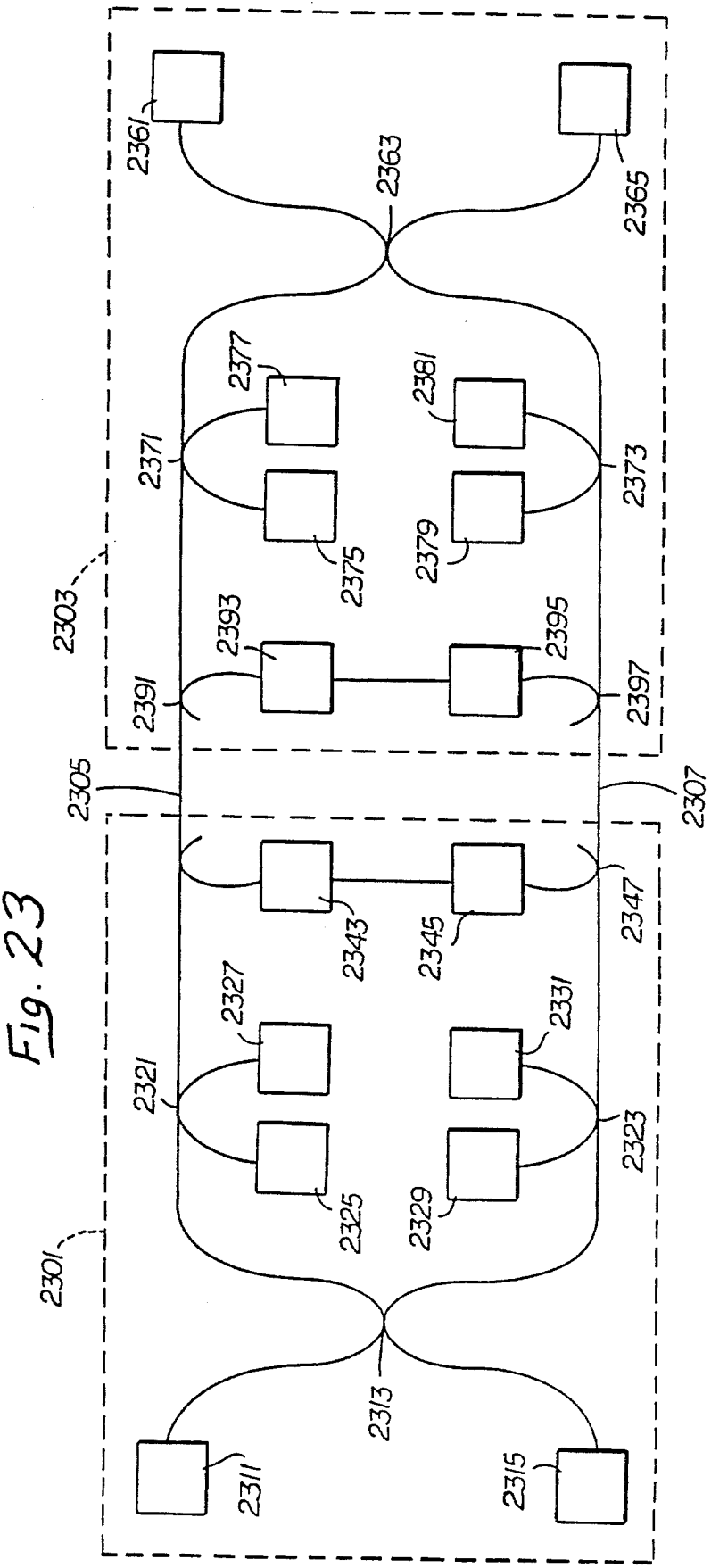
FIG. 23 is a schematic block diagram of a full duplex secure fiber optic communication system that uses ratioed multispectral alarm systems.

Another embodiment of the full duplex mulitspectral secure fiber optic communication system is shown in FIG. 23. A pair of transceivers 2301 and 2303 are shown connected by a pair of optical fiber 2305 and 2307. Beginning at the left, transceiver 2301 contains light source 2311 connected to one of four ports of a central beamsplitter 2313. A detector 2315 is connected to beamsplitter 2313. The other two parts of beamsplitter 2315 are connected to the optic fibers 2305 and 2307. The third and fourth ports of beamsplitters 2313 are connected to taps 2321 and 2323, respectively. Tap 2321 is connected to detectors 2325 and 2327 while tap 2323 is connected to detectors 2329 and 2331. A series connection is established within transceiver 2301 between optical fiber 2305 and 2307 beginning at fiber 2305 and comprising a wavelength division mulitplexer 2341, a random pathlength generator 2343, phase modulator 2345 and wavelength division multiplexer 2347.

Similarly, transceiver 2303 contains light source 2361 connected to one of four ports of a central beamsplitter 2363. A detector 2365 is connected to the beamsplitter 2363. The other two ports of a beamsplitter 2363 are connected to the optic fibers 2305 and 2307. The third and fourth ports of beamsplitter 2363 are connected to taps 2371 and 2373, respectively. Tap 2371 is connected to detector 2375 and 2377 while tap 2373 is connected to detectors 2379 and 2381. A series connection is also established within transceiver 2303 between optical fiber 2305 and 2307 beginning at fiber 2305 and comprising a wavelength division multiplexer 2391, a random pathlength generator 2393, phase modulator 2395 and wavelength division mulitplexer 2397.

Here, in FIG. 23, instead of the detector tap combinations of FIG. 20, alarm systems are built around the fiber taps 2321, 2371, 2323 and 2373 of transceivers 2301 and 2303. The taps 2321 and 2323 are used to monitor the output from the light source 2311, the performance of the beamsplitter 2313 and the light power of the counterpropagating light beams generated by the light source 2311 through the Sagnac loop formed between transceiver 2301 and 2303. The ratio of the light power on detector 2327 and 2331 can be used to normalize any deviations from a stable split of the optical power by the beamsplitter 2313. The sum of the power on detector 2327 and 2331 monitors the total light injected into the system by the light source 2311. The detectors 2325 and 2329 can be used for direct detection of power level in the Sagnac loop. Their ratio can be used to detect attempts to make unauthorized single sided taps. Similarly, the detectors 2375, 2377, 2379 and 2381 are used in combination with the taps 2371 and 2373 to monitor the Sagnac loop driven by the light source 2361.

Figure 24:
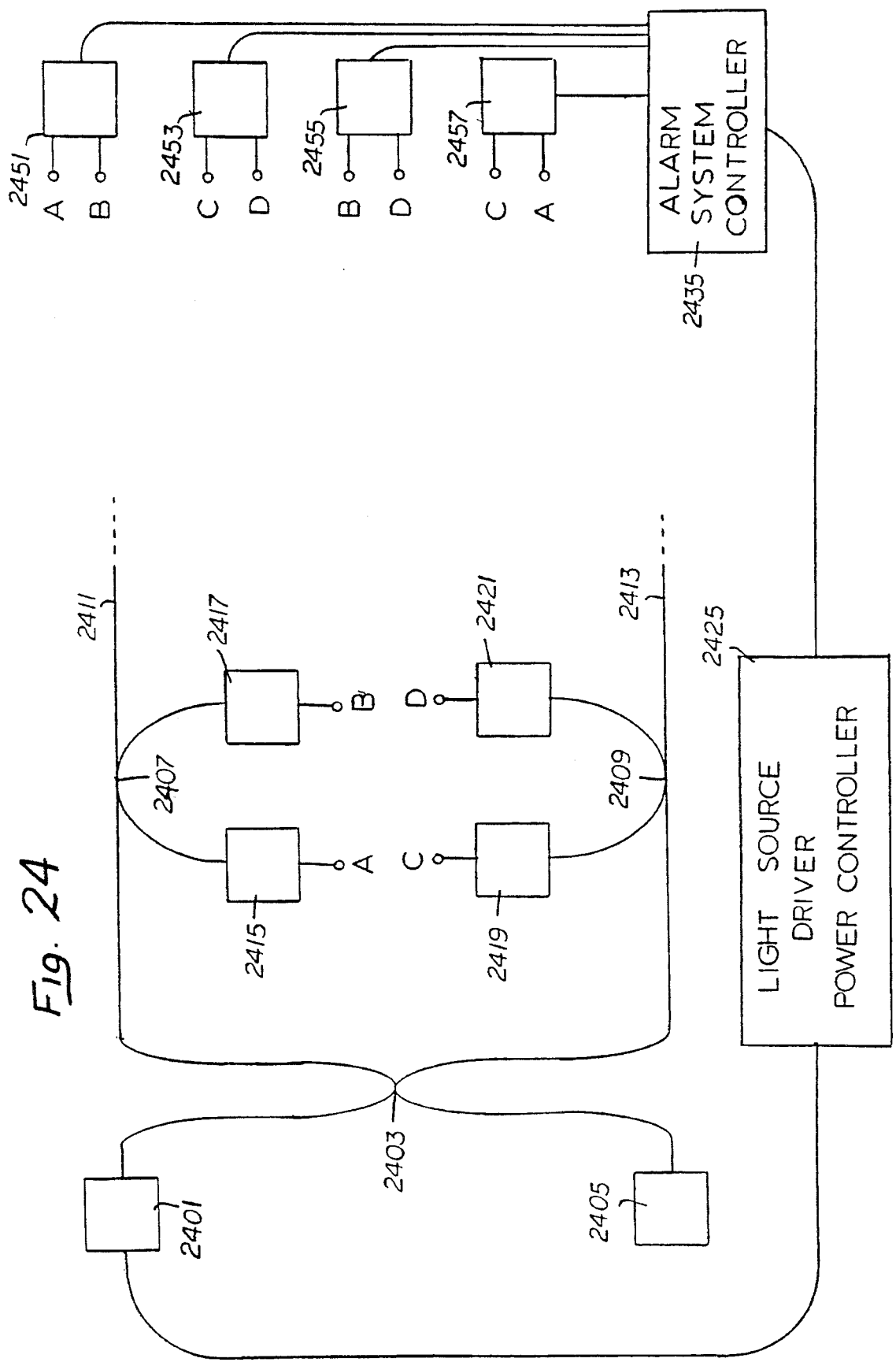
FIG. 24 illustrates in block diagram form the electronics used to support the alarm system for FIG. 23.

FIG. 24 is a block diagram of the alarm electronics that would be associated with the alarm system of FIG. 23. A light source 2401 is connected to one port of a central beamsplitter 2403, which is in turn connected to a detector 2405 similar to those illustrated in earlier FIG's. A pair of taps 2407 and 2409 are each connected to the optical fibers 2411 and 2413, respectively. Tap 2407 is connected to detector 2415 which has an output A and to detector 2417 which has an output B. Similarly, tap 2409 is connected to a detector 2419 which has an output C and detector 2421 which has an output D. The outputs are so labelled to avoid drawing the connection lines on FIG. 24, whose cross connection would complicate the drawing.

Light source 2401 is connected to a light source driver power control 2425. Light source driver power control 2425 is in turn connected to an alarm system controller 2435. Alarm system controller 2435 receives inputs from and is connected to ratio direct detection circuits 2451 and 2453 and ratio sum detection circuits 2455 and 2457. Ratio direct detection circuits 2451 receives inputs A and B from detectors 2415 and 2417, respectively while ratio direct detection circuit 2453 receives inputs C and D from detectors 2419 and 2421, respectively. Ratio sum detection circuit 2455 receives inputs B and D from detectors 2417 and 2421, respectively while ratio sum detection circuit 2457 receives inputs A and C from detectors 2415 and 2419, respectively.

The alarm system controller 2435 stabilizes the light source 2401 output via the light source driver/power controller 2425. If the power levels on the detectors 2415, 2417, 2419 or 2421 fall outside of the expected levels, the alarm system controller 2435 shuts down the light source 2401 and may be used to activate acoustic or other electronic alarms. Many multiple redundant variations of alarm sceanarios could be programmed into the controller. This would improve fault tolerance. The systems of FIGS. 20–24 could be used in conjunction with all secure communication applications compatible with the usage of single mode optical fiber including terrestial telecommunications and computer networks.

Figure 25:
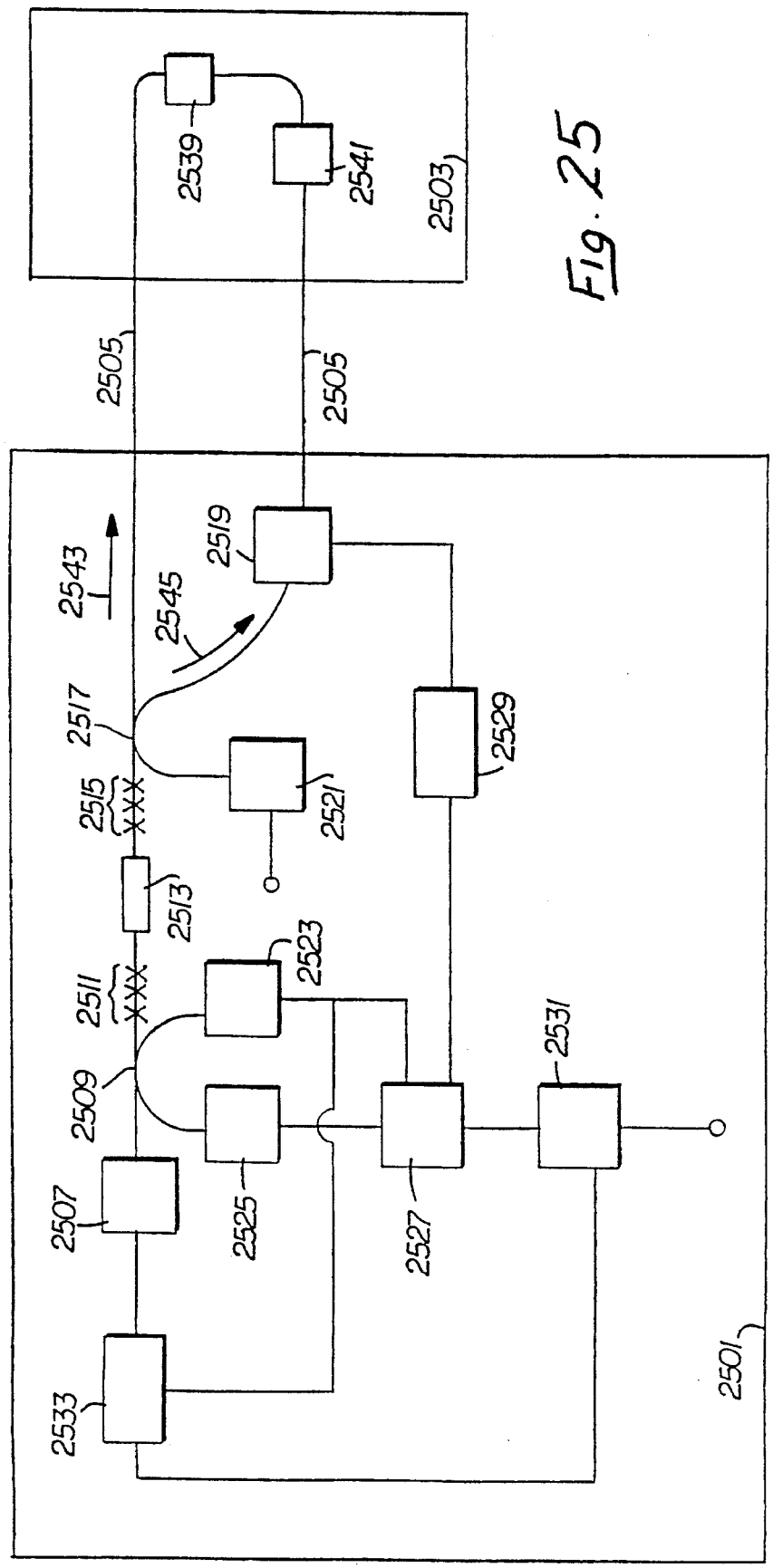
FIG. 25 illustrates a secure fiber optic communication system with an interferometric alarm.

FIG. 25 illustrates an interferometric alarm system. It consists of a receiver section 2501, and a transmitter section 2503 a connecting fiber pair 2505. The receiver section 2501 consists of the light source 2507, input output beamsplitter 2509, fiber depolarizer 2511, fiber polarizer 2513, fiber depolarizer 2515, central fiber optic beamsplitter 2517, phase modulator 2519, system output detector 2521, light source monitoring detector 2523, interferometric alarm system detector 2525, harmonic analizer 2527, alarm threshold detector 2531, oscillator 2529, and light source driver 2533. Transmitter section 2503 includes passband filter 2539 and phase modulator 2541.

The operation of the device illustrated by FIG. 25 is as follows. Light from the light source 2507 is coupled into one leg of the input/output fiber beamsplitter 2509. One portion of this light beam is fed into the light source monitoring detector 2523. The output from the light source monitoring detector 2523 is fed to the light source controller 2533 and used to stabilize the output of the light source 2507. The output of the light source detector 2523 is also fed into the harmonic analizer 2527 and is used to provide a signal level reference. The signal is compared to an initialized alarm system output signal established during turn on by the harmonic signal analyzer. The other portion of the light beam is depolarized by the depolarizing element 2511 which may be a Lyot fiber depolarizer. After depolarization, the light beam enters the polarizing element 2513 which establishes a single polarization state for a highly reciprocal system in analogy to the techniques employed for fiber optic gyroscopes. After passing through the polarizing element 2513 the light beam is once again depolarized by the depolarizing element 2515. The light beam then enters the central fiber optic beamsplitter 2517 where it is split into counterpropagating light beams. The clockwise propagating light beam proceeds in direction 2543 while the counterclockwise light beam proceeds in direction 2545. The clockwise propagating light beam circulates through the Sagnac loop through the wavelength passband filter 2539. The wavelength passband filter 2539 is designed to attenuate light outside the detection band of the alarm system. The clockwise propagating light beam then proceeds through the phase modulator 2541. Phase modulatoar 2541 is used to impress data onto both of the counterpropagating light beams in the form of both of relative phase differences. Phase modulator 2519 is used to generate a reference signal for the interferometric alarm system by modulating the relative phase between the counterpropagating light beams. The reference signal frequency impressed by phase modulator 2519 is chosen so as not to interfere with the transmitted data. As an example, this choice of non interfering frequencies may be performed by using a reference signal frequency that is much lower than the tranmitted signal frequency. The purpose of the alarm system formed by the phase modulator 2519, the harmonic analizer 2527, the oscillator 2529 is to prevent successful sophisticated intrusions onto the system. In particular intrusion system that tap light from the Sagnac loop and attempt to compensate by reinjecting light into the system would be greatly complicated by this alarm. The counterclockwise counterpropagating beam of light of direction 2545 circulates about the Sagnac loop in the opposite direction. After cycling through the Sagnac loop in opposite directions the two light beams recombine on the central fiber optic beamsplitter 2517. The recombined light beams interfere resulting in amplitude modulated signals that include the transmitted data and the alarm system reference. The portion of the signal that is directed to the output detector 2521 is used to reconstruct the data stream. The other portion of the signal is directed back through the depolarizer 2515, polarizer 2513 and depolarizer 2511 to the beamsplitter 2509 and the output alarm detector 2525. Note that the depolarizer 2511 could be moved from the position shown in FIG. 25 to a position located between the light source 2507 and the input output beamsplitter 2509.

This procedure would result in the advantage of an increase in alarm system signal level which in turn would depend on the intrinsic loss within the fiber depolarizer 2511. The output of the alarm detector 2525 is then fed into the harmonic analyser 2527. The harmonic analyser 2527 is also connected to the tunable oscillator 2529 that is used to drive the phase modulator 2519. The function of the harmonic analyser 2527 is to measure the power of the counterpropagating light beams in the Sagnac loop as they circulate. Since only the light beams that interfere coherently and carry the phase modulated signal produced by the modulator 2519 generate the alarm signal, many types of intrusion are thus complicated. The output from the harmonic analyser 2527 is feed into an alarm system 2531 which monitors changes in the alarm signal level. If the threshold of the alarm system 2531 is exceeded, a signal is sent to the light source controller 2533 that shuts down the light source 2507 output. This alarm system within the receiver of FIG 25 could be used in combination with any of the several other alarm system described for the other FIGS. above to form a very secure communication system.

All of the above system described secure fiber optic communication systems whose length is limited by fiber attenuation. To achieve longer lengths one could put these systems back to back. The disadvantage of this approach is that the data comes out electrically and must be guarded. Ideally, one would like an all optical repeater which does not compromise security or need to be guarded. Several methods of doing this are described in the following FIGS.

Figure 26:
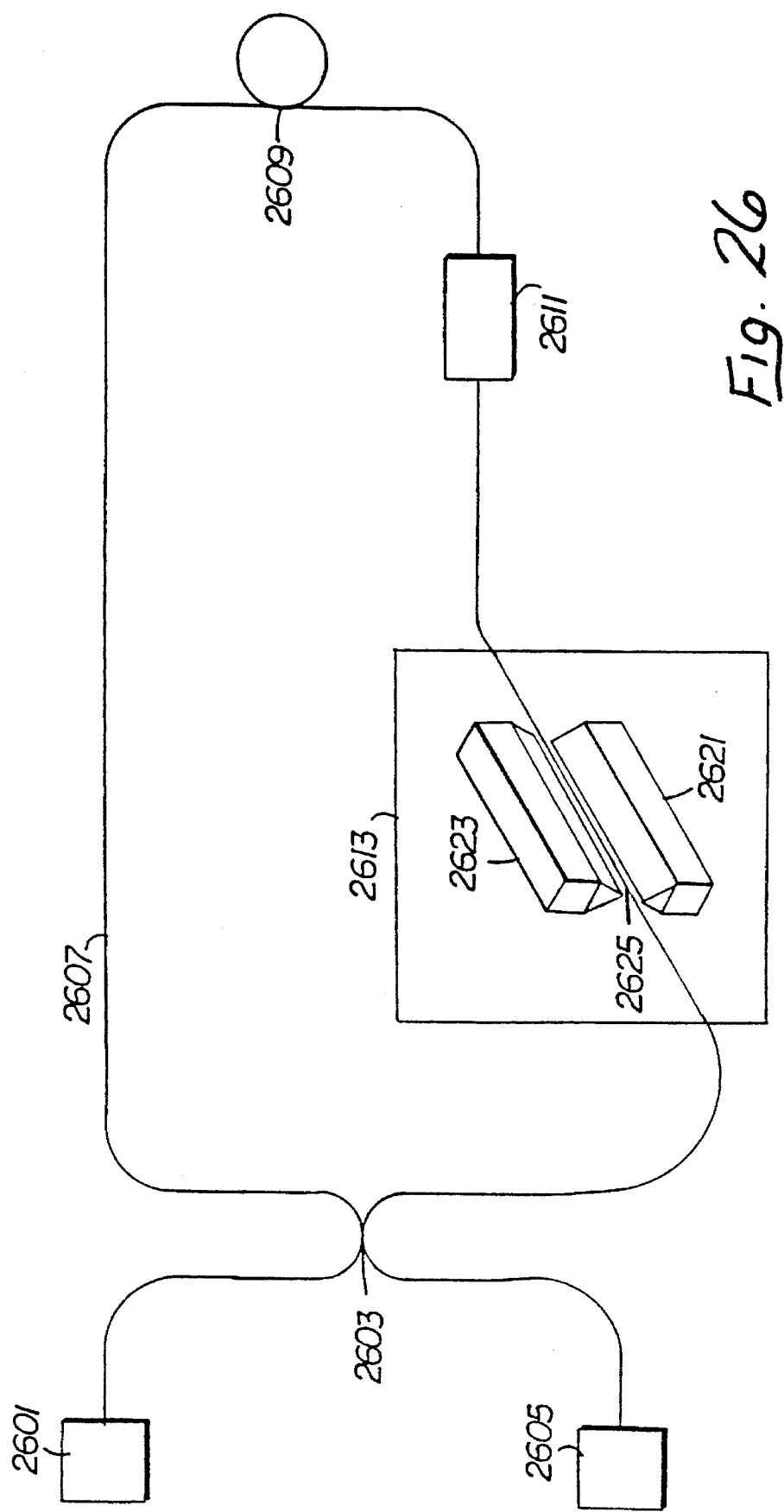
FIG. 26 illustrates an all optical repeater that is used to extend the range of the secure fiber optic communication system.

FIG. 26 shows an all optical repeater embedded into a basic Sagnac interferometer based secure communication system.

A light source 2601 is connected to the first part of a beamsplitter 2603. Beasmplitter 2603 is connected back into a detector 2605. The second port of the third and fourth ports of beamsplitter 2603 form a Sagnac loop 2607 series connection between a random pathlength generator 2609, phase modulator 2611 and a secure repeater station 2613. Within secure repeater station 2613, diode arrays 2621 and 2623 are present to provide light pumping of a fiber amplifier. The section of fiber 2625 between diode arrays 2621 and 2623 is a doped fiber used to amplify the light beams circulating about a Sagnac loop formed between the series connections between parts 3 and 4 of beamsplitter 2603. Laser diode arrays 2621 and 2623 are used to side pump the doped fiber regions so that light circulating through them is amplified. As a specific example the laser diode array could consist of GaAs based light sources emitting in the 0.8 to 0.9 micron wavelength region. The region of fiber being pumped could be doped with trace materials such as erbium which absorb strongly in this region. The resultant excited states for this example would then act as an optical amplifier for light in the longer 1.3 to 1.5 micron region.

Figure 27:
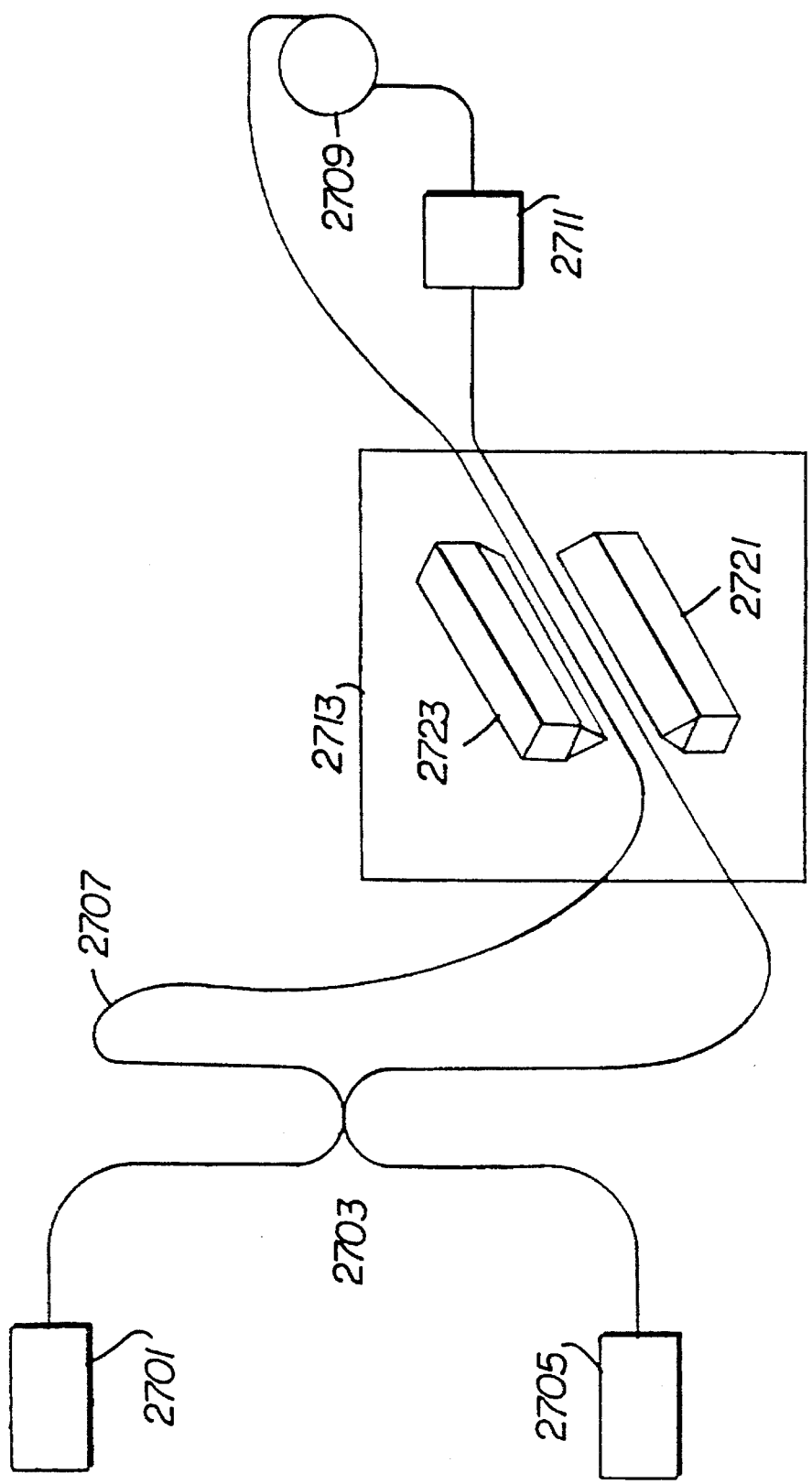
FIG. 27 illustrates an all optical repeater that is used to amplify the signal level in both legs of the Sagnac loop to extend the range of the secure fiber optic communication system.

FIG. 27 is similar to FIG. 26. A light source 2701 is connected to the first port of beamsplitter 2703. The second port of beamsplitter 2703 is connected back into a detector 2705. A Sagnac fiber loop 2707 makes a series connection between ports 3 and 4 of beamsplitter 2703, but also is made to pass through secure repeater station 2713 twice, both before and after making series connection with random pathlength generator 2709 and phase modulator 2711. Diode arrays 2721 and 2723 are within repeater station 2713.

Figure 28:
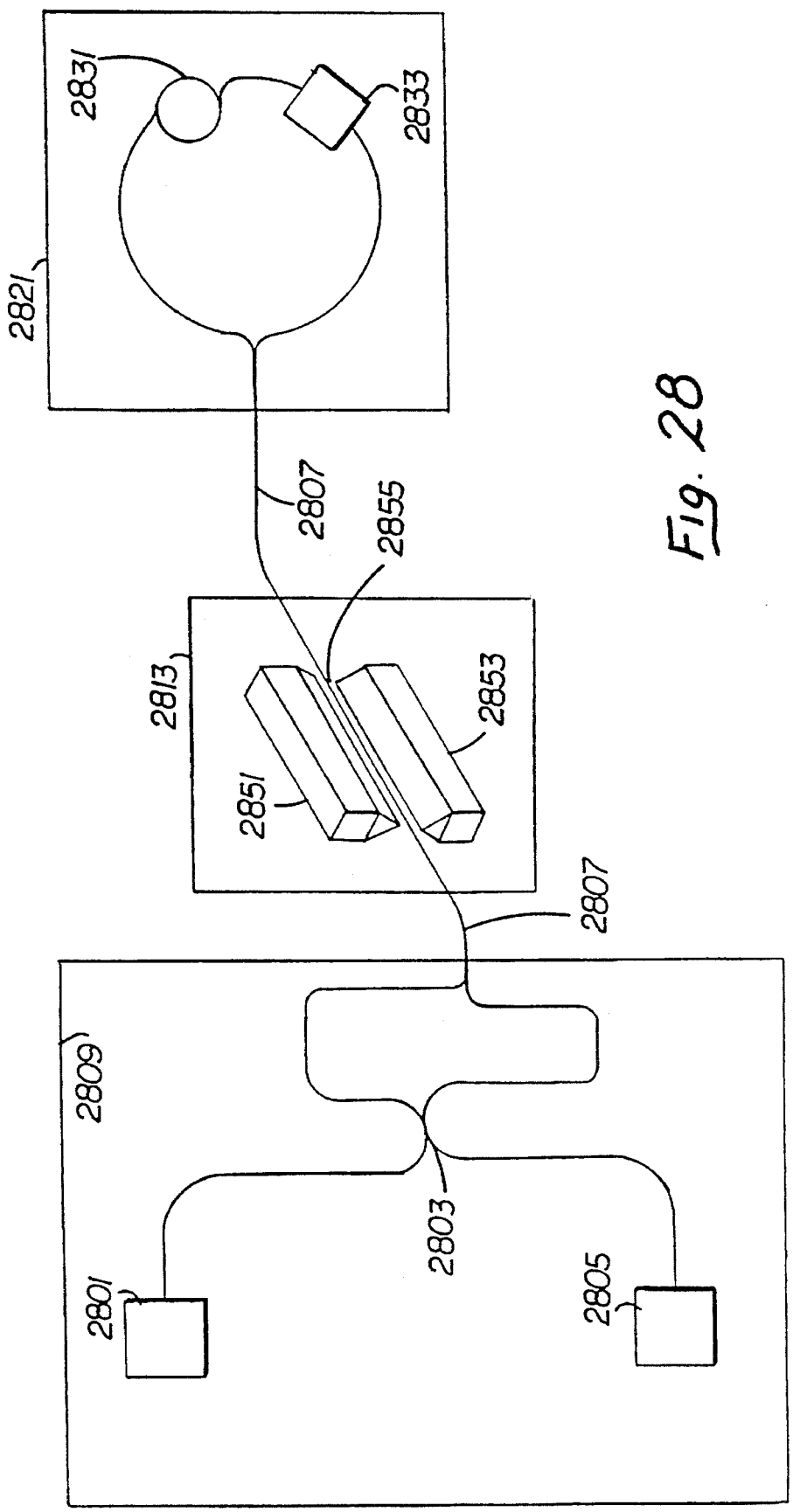
FIG. 28 illustrates an all optical fiber repeater for the secure fiber optic communication system based on the usage of dual core optical fiber.

In FIG. 27 the fiber 2707 is used for the optical link to support the fiber optic loop 2707. FIG. 28 is similar to FIG. 27, except that dual core optical fiber is used. A light source 2801 is connected to the first port of a beamsplitter 2803. A second port of beamsplitter 2803 is connected to a detector 2805. The third and fourth ports of beamsplitter 2803 is connected to two ports of a dual core optical fiber 2807. Dual core optical fiber 2807 extends through a boundary demarking a receiver section 2809 before extending through repeater station 2813 to reach transmitter section 2821. Within transmitter secion 2821, dual core optical fiber 2807 form a series connection between their dual cores through a random pathlength generator 2831, and phase modulator 2833.

Within the repeater station 2813 is a pair of diode arrays 2851 and 2853 surrounding dual core fiber 2807. The region 2855 of the dual core fiber 2807 is doped so that it acts as a fiber amplifier. The close proximities of the paths within dual core fiber 2807 causes environmental effects to become minimized. The use of dual core fiber substantially increase the complexities, and therefore enhances the difficulty associated with unauthorized entry into the secure system. In addition, the number of individual fibers required to support the system would be reduced.

Figure 29:
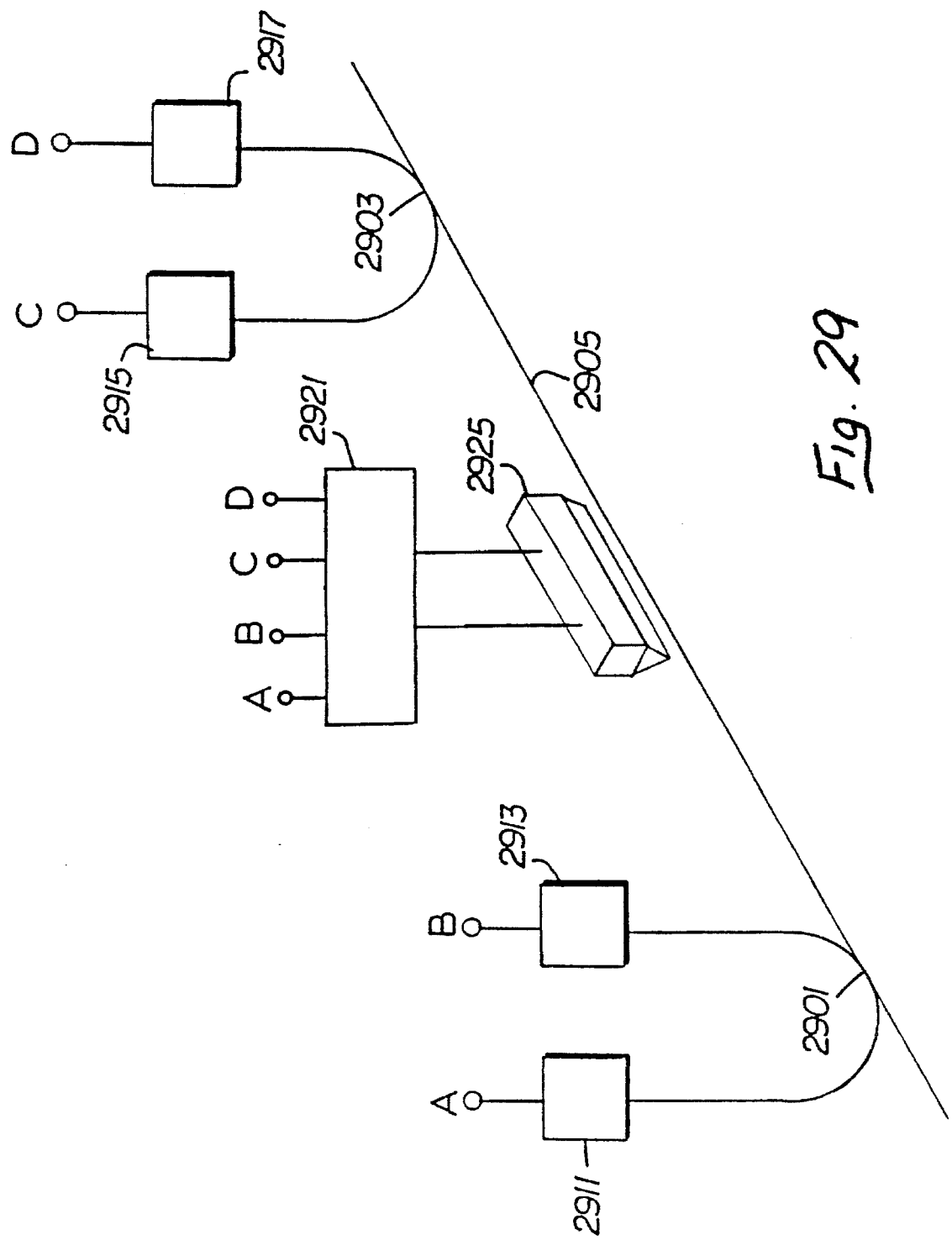
FIG. 29 illustrates an alarm system for an all optical repeater that uses a side pumped amplifying section of fiber.

The details of the side pumped doped fiber amplifier section, are shown in FIG. 29. Fiber optic taps 2901 and 2903 are placed on both sides of the amplifying section of fiber 2905 so that the light levels of the incoming and outgoing light beams may be measured by the detectors 2911, 2913, 2915 and 2917 having outputs A, B, C, and D, respectively. Detector outputs A, B, C, and D are fed into a laser diode array controller 2921 that adjusts the laser diode array pump 2925 level to maintain a constant level of amplification. They are also used to support an alarm system placed about the amplifying fiber.

Figure 30:
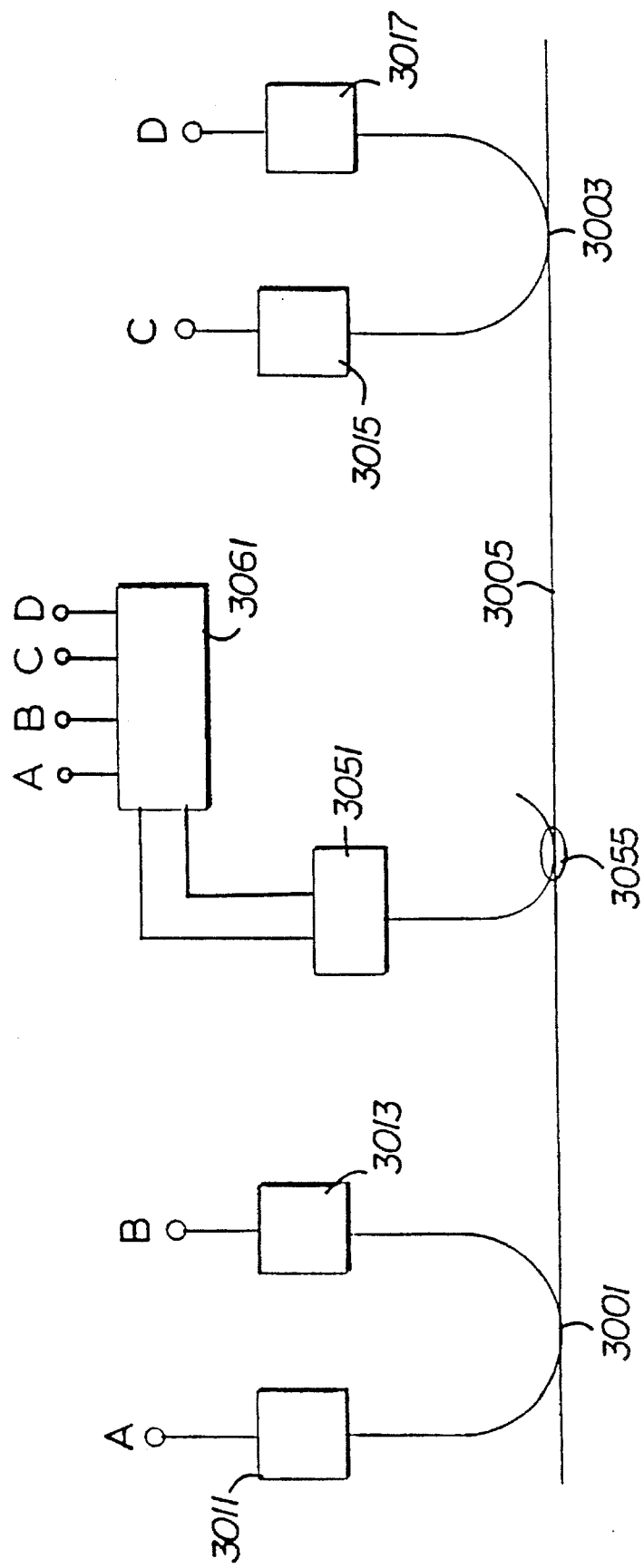
FIG. 30 illustrates an alarm system for an all optical repeater that uses an end pumped amplifying section of fiber.

FIG. 30 shows an alternative configuration for the repeater station that is easier to implement. Again, taps 3001 and 3003 on line 3005 connect to detectors 3011, 3013, 3015 and 3017 having outputs A, B, C, and D, respectively. A single laser diode 3051 is pigtailed in to optical fiber 3005 and spliced into a wavelength division multiplexing fiber beamsplitter 3055. A laser diode controller 3061 receives inputs A, B, C, and D from detectors 3011, 3013, 3015 and 3017, respectively. Laser diode controller 3061 connectedly controls laser diode 3051.

In the most likely scenario the diode 3051 will be GaAs emitting light in th 0.8 micron wavelength region, and the fiber multiplexer 3055 will be designed to cross couple light at this wavelength. The fiber 3055 will be doped with trace materials to support amplification at either the 1.3 or 1.5 micron region, specifically the fiber amplification section would be designed to absorb strongly photons in the 0.8 micron wavelength region forming excited states that reemit photons in the longer 1.3 to 1.5 micron region. The multiplexing element 3055 will be arranged so that light in this region passes directly through it. The taps 3001 and 3003, detectors 3011, 3013, 3015 and 3017 and laser diode controller 3061 operate in a manner analogous to the fiber optic repeater of FIG. 29.

These above repeaters may be made in all optical format so that the data is not regenerated electronically at any point in the repeater box. This offers the advantage of extremely long secure links without the need of guarded repeater sations.

This approach could be used to support very long haul secure fiber opic links as required. Examples would include transcontinental and transoceanic links as well as many shorter but significantly long links on the order of hundreds of kilometers.

This is believed to be the first practical configuration of a coherent communication system with all optical repeaters. It is almost certainly the first secure implementation of optical repeaters in a fiber optic communication system.

Figure 31:
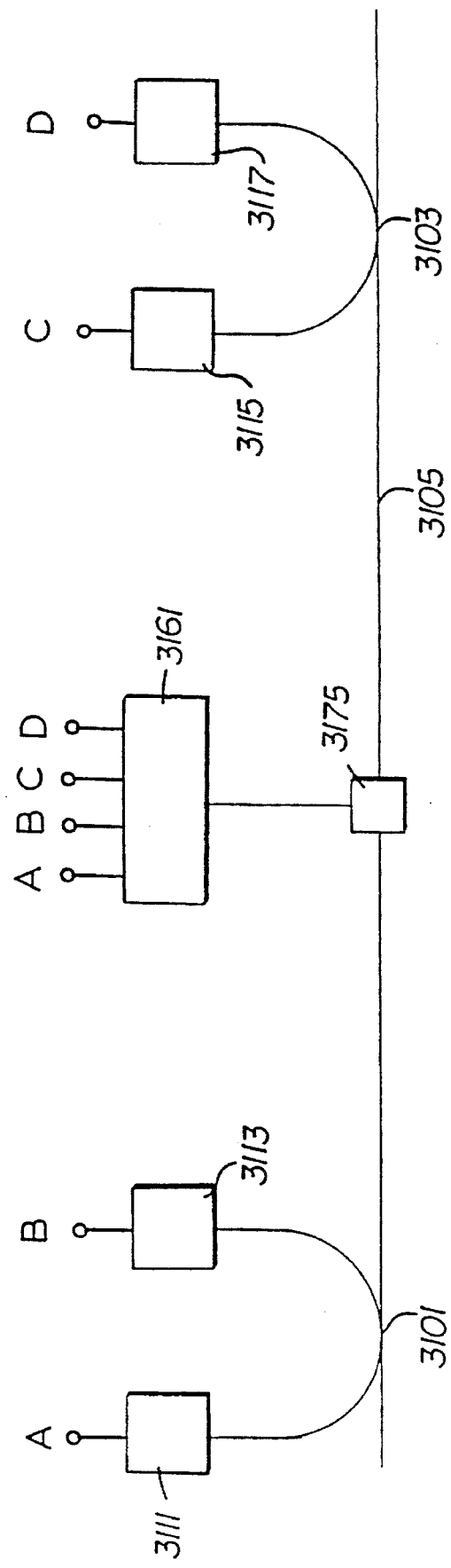
FIG. 31 illustrates an alarm system for an all optical repeater that uses a semiconductor amplifying section.

FIG. 31 shows an all optical repeater similar to that illustrated by FIG. 30. As before, taps 3101 and 3103 are found along fiber 3105 to connect with detectors 3111, 3113, 3115 and 3117 having outputs A, B, C, and D, respectively. Inputs A, B. C, and D are made available to a semiconductor controller 3161. Semiconductor controller 3161 controls an optically active semiconductor 3175 which is pigtailed into fiber 3105. The optically active semiconductor 3175 devices are currently being built and marketed by BTD a joint venture of British Telecom and Dupont.

The foregoing disclosure and description of the secure communication system of the present invention is illustrative and explanatory thereof, and various changes in the specific transducers necessary to effect action in the system, in the order of placement of the components described herein, the system configuration, system scale, types of materials and plan orientation, as well as in the details of the illustrated configuration shown herein, may be made without departing from the spirit and scope of the invention.

What is claimed is:

1. A secure communication system comprising:

a light source for producing light;

a central beam splitter, having a first port optically connected to said light source, and a second, third, and fourth port, said beam splitter being adapted to receive a first beam of light from said light source, split said first beam of light into a second and a third beam of light, and recombine said second and said third beams into a fourth beam of light which is adapted to be received by said fourth port;

a detector, connected to said second port of said central beam splitter, for detecting momentary and steady state phase shifts of said second and said third beams of light from said fourth light beam;

a fiber optic path having a first end optically connected to said third port of said central beam splitter, a second end optically connected to said fourth port of said central beam splitter; and a midpoint located on said fiber optic path substantially equidistant from each of said first and second ends, for facilitating the propagation of said second and said third beams of light in counterpropagating directions;

a phase modulating device, located along and optically connected to said fiber optic path and offset from the midpoint of said fiber optic path, for modulating light travelling toward and away from said phase modulating device;

an alarm beam splitter, having a first and a second output port located along and optically connected to said fiber optic path, for coupling a portion of the light propagating within said fiber optic path from said fourth port of said central beam splitter into said second output port;

a first light intensity detector, having an optical input optically connected to said first output port of said alarm beam splitter and an electrical output for detecting and generating an output electrical signal indicative of light intensity fluctuations propagating along said fiber optic path from said fourth port of said central beam splitter; and a second light intensity detector, having an optical input optically connected to said second output port of said alarm beam splitter, and an electrical output, for detecting and generating an output electrical signal indicative of light intensity fluctuations propagating along said fiber optic path from said third port of said central beam splitter.

2. The secure communication system of claim 1 and further comprising a ratio transducer having a first output connected to said electrical output of said first light intensity detector, a second input connected to said second light intensity detector, and a ratio signal output, for comparing and outputting an electrical signal through said ratio signal output indicative of the electrical output signal from said first light intensity detector with the electrical output from said second light intensity detector.

3. A secure communication system comprising:

a light source for producing light;

a central beam splitter, having a first port optically connected to said light source, and a second, third, and fourth port, said beam splitter being adapted to receive a first beam of light from said light source, split said first beam of light into a second and a third beam of light, and recombine said second and said third beams into a fourth beam of light which is adapted to be received by said fourth port;

a detector, connected to said second port of said central beam splitter, for detecting momentary and steady state phase shifts of said second and said third beams of light from said fourth light beam;

a fiber optic path having a first end optically connected to said third port of said central beam splitter, a second end optically connected to said fourth port of said central beam splitter, and a midpoint located on said fiber optic path substantially equidistant from each of said first and second ends, for facilitating the propagation of said second and said third beams of light in counterpropagating directions;

a phase modulating device, located along and optically connected to said fiber optic path and offset from the midpoint of said fiber optic path, for modulating light travelling toward and away from said phase modulating device;

a first alarm beam splitter located along and optically connected to said fiber optic path and having an optical output for coupling a portion of the light propagating within said fiber optic path from said fourth port of said central beam splitter into said optical output;

a second alarm beam splitter located along and connected to said fiber optic path and having an optical output for coupling a portion of the light propagating within said fiber optic path from said third port of said central beam splitter into said optical output;

a first light intensity detector, having an optical input optically connected to said output port of said first alarm beam splitter and an electrical output for detecting and generating an output electrical signal indicative of light intensity fluctuations propagating along said fiber optic path from said fourth port of said central beam splitter; and a second light intensity detector, having an optical input optically connected to said output port of said second alarm beam splitter, and an electrical output, for detecting and generating an output electrical signal indicative of light intensity fluctuations propagating along said fiber optic path from said third port of said central beam splitter.

4. The secure communication system of claim 3 and further comprising a ratio transducer having a first output connected to said electrical output of said first light intensity detector, a second input connected to said second light intensity detector, and a ratio signal output, for comparing and outputting an electrical signal through said ratio signal output indicative of the electrical output signal from said first light intensity detector with the electrical output from said second light intensity detector.

5. A secure communication transceiver comprising:

a light source for producing a first beam of light having a first wavelength characteristic;

a central beam splitter, having a first port optically connected to said light source, and a second, third and fourth port, said beam splitter being adapted to receive said first beam of light from said light source, split said first beam of light into a second and a third beam of light, and recombine said second and said third beams into a fourth beam of light which is adapted to be received by said second port;

a detector, optically connected to said second port of said central beam splitter, for detecting momentary and steady state phase shifts of said second and said third beams of light from said fourth light beam;

a first wavelength division multiplexing device having a first port optically connected to said fourth port of said central beam splitter, a second and a third port, for routing light having said first wavelength characteristic from said first port to said third port and from said third port to said first port, and for routing light having a second characteristic wavelength from said third port to said second port and from said second port to said third port;

a second wavelength division multiplexing device having a first port optically connected to said third port of said central beam splitter, a second and a third port, for routing light having said first wavelength characteristic from said first port to said third port and from said third port to said first port, and for routing light having a second characteristic wavelength from said third port to said second port and from said second port to said third port;

a first alarm beam splitter, having a first port optically connected to said second port of said first wavelength division multiplexing device, a second port and a third port, for routing light from said first port to said third port and said third port to said first port and for splitting a portion of the light routed from said first aport to said third port through said second port;

a second alarm beam splitter, having a first port optically connected to said second port of said second wavelength division multiplexing device, a second port and a third port, for routing light from said first port to said third port and said third port to said first port and for splitting a portion of the light routed from said first aport to said third port through said second port;

a light intensity detector, optically connected to said second ports of said first and second alarm beam splitters, for detecting light intensity fluctuations at said second ports of said first and second alarm beam splitters; and a phase modulating device, having a first port connected to said second port of said first alarm beam splitter and a second port connected to said second port of said second alarm beam splitter, for phase modulating light having said second wavelength characteristic passing in both directions through the first and second ports of the phase modulating device.

6. A secure communication system, comprising a first and a second secure communication transceiver as claimed in claim 5 and wherein said third ports of said first and second wavelength division multiplexing devices of said first transceiver is optically connected to said third ports of said first and second wavelength division multiplexing devices, respectively, of said second transceiver, and wherein the first beam of light having a first wavelength characteristic of said first transceiver is equal to the second wavelength characteristic of the second transceiver, and the second wavelength characteristic of said first transceiver is equal to the first wavelength characteristic of the first transceiver, and said phase modulation device of said first transceiver is displaced from the center of a fiber optic path formed with respect to said central beam splitter of said second transceiver and wherein said phase modulation device of said second transceiver is displaced from the center of a fiber optic path formed with respect to said central beam splitter of said first transceiver.

7. A communication system comprising:
- a light source for producing a first beam of light;
- a central beam splitter, having a first port optically connected to said light source, and a second, third, and fourth port, said beam splitter being adapted to receive a first beam of light from said light source, split said light into a second and a third beam of light, and recombine said second and said third beams into a fourth beam of light which is adapted to be received by said fourth port;
- a detector, connected to said second port of said central beam splitter, for detecting momentary and steady state phase shifts of said second and said third beams of light from said fourth light beam;
- a fiber optic path having a first end optically connected to said third port of said central beam splitter and a second end optically connected to said fourth port of said central beam splitter for facilitating the propagation of said second and said third beams of light in counterpropagating directions;
- a phase modulating device, located along said fiber optic path and in optical connection with said third and said fourth ports of said central beam splitter, for phase modulating said third and said fourth counterpropagating beams of light;
- doped fiber means, located at some point along said fiber optic path, for adapting said second and said third beams of light to an optical pumping function; and
- diode array means, adjacent to the length of said doped fiber means, for light pumping and increasing the intensity of said second and third beams of light within said doped fiber means, said doped fiber means and said diode array means forming a repeater station.

8. The communication system of claim 7, and further comprising a pseudorandom pathlength generator, optically connected in series along said fiber optic path means, for pseudorandomly changing the optical pathlength between said third and said fourth ports of said central beam splitter.

9. The communication system of claim 7 wherein said diode array means further comprises:
- a first diode array adjacent said doped fiber means;
- a second diode array adjacent said doped fiber means and on the opposite side of said doped fiber means with respect to said first diode array.

10. A communication system, comprising:
- a light source for producing a first beam of light;
- a beam splitter, having first, second, third and fourth ports, said first port being optically connected to said light source, said beam splitter being adapted to receive said first beam of light into said first port, split said first beam of light into a second and a third beam of light through said fourth and third ports, respectively, and recombine said second and said third beams into a fourth beam of light into said second port;
- a detector, optically connected to said second port of said beam splitter, for detecting light received from said beam splitter; and
- a phase modulator, having a first port optically connected to said third port of said beam splitter and having a second port connected to said fourth port of said beam splitter, for modulating time varying signals upon light propagating toward and away from said beam splitter, said light source, beam splitter, and said detector being colocated to function as a receiver and said phase modulator being adapted to function as a transmitter.

11. The communication system of claim 10 wherein said time varying signal is a sawtoothed wave.

12. A secure fiber optic communication system comprising:
- a light source for inputting a beam of light into a first optical fiber;
- a first beam splitter having a first port optically connected to the first optical fiber, a second port optically connected to a first optical detector, and third and fourth ports optically connected to opposite ends of an optical fiber loop such that the third port receives a clockwise light beam from the loop propagating in a clockwise direction and the fourth port receives a counterclockwise light beam from the loop propagating in a counterclockwise direction;
- a signal source optically connected to the loop for modulating signals onto the light beams in the loop;
- an alarm means optically connected to the loop for detecting a change in the optical characteristics in the loop; and
- an electrical circuit optically connected to the first optical detector for demodulating the signal from the optical output received by the first detector from the light beams in the loop.

13. The system of claim 12 wherein the signal source comprises a phase modulator.

14. The system of claim 13 wherein said optical fiber loop includes a midpoint located substantially equidistant from each of said opposite ends, said phase modulator being offset from the midpoint of the loop.

15. The system of claim 12 wherein a pseudorandom pathlength generator is optically connected to the loop.

16. The system of claim 12 wherein the alarm means is an optical power measuring system comprising a second beam splitter optically connected to the optical fiber loop, one port of the second beam splitter being optically connected to a first optical power alarm detector for sensing the clockwise light beam and a second port being optically connected to a second optical power alarm detector for sensing the counterclockwise light beam, the alarm means further comprising a ratio transducer optically connected between outputs of the first and second alarm detectors to provide an alarm indication if an output power ratio from the first and second alarm detectors varies beyond a predetermined level.

17. The system of claim 16 wherein the alarm means is an optical frequency measuring system comprising a plurality of said power measuring systems, each of said power measuring systems being optically connected to the loop wherein the second beam splitter of each passes to its corresponding first and second power alarm detectors only a single bandwidth of optical frequencies centered about one of a plurality of different optical frequencies contained within a predetermined spectrum transmitted from the light source means.

18. The system of claim 12 wherein the alarm means is an optical power measuring system comprising a second beam splitter optically connected to the loop and having an output port which provides a portion of the clockwise light beam to a first optical power alarm detector, a third beam splitter optically connected to the loop and having an output port which provides a portion of the counterclockwise beam to a second optical power alarm detector, and a ratio transducer optically connected to outputs of the first and second power alarm detectors to provide an alarm indication if the output power ratio between the first and second power alarm detectors varies beyond a predetermined level.

* * * * *